United States Patent
Moloto et al.

(10) Patent No.: US 12,437,938 B2
(45) Date of Patent: Oct. 7, 2025

(54) ALKALI METAL QUATERNARY NANOMATERIALS

(71) Applicant: UNIVERSITY OF THE WITWATERSRAND, JOHANNESBURG, Johannesburg (ZA)

(72) Inventors: Nosipho Moloto, Johannesburg (ZA); Kalenga Mubiayi, Johannesburg (ZA); Grace Ngubeni, Johannesburg (ZA)

(73) Assignee: UNIVERSITY OF THE WITWATERSRAND, JOHANNESBURG, Johannesburg (ZA)

( * ) Notice: Subject to any disclaimer, the term of this patent is extended or adjusted under 35 U.S.C. 154(b) by 80 days.

(21) Appl. No.: 17/910,022

(22) PCT Filed: Mar. 11, 2021

(86) PCT No.: PCT/IB2021/052050
§ 371 (c)(1),
(2) Date: Sep. 8, 2022

(87) PCT Pub. No.: WO2021/181334
PCT Pub. Date: Sep. 16, 2021

(65) Prior Publication Data
US 2023/0112176 A1    Apr. 13, 2023

(30) Foreign Application Priority Data

Mar. 11, 2020   (ZA) ................. 2020/01521

(51) Int. Cl.
*B82Y 30/00* (2011.01)
*C01B 19/00* (2006.01)
(Continued)

(52) U.S. Cl.
CPC ............ *H01G 9/2022* (2013.01); *B82Y 30/00* (2013.01); *C01B 19/002* (2013.01);
(Continued)

(58) Field of Classification Search
CPC ...... H01G 9/2054; H01G 9/2045; H01G 9/20; H10F 77/128; H10F 77/12; H10F 77/10
See application file for complete search history.

(56) References Cited

U.S. PATENT DOCUMENTS

2012/0055554 A1    3/2012   Radu et al.

OTHER PUBLICATIONS

Brant, J. (2015). Synthesis, Structure Elucidation and Physicochemical Characterization of Li2-li-lv-S4 Diamond-Like Semiconductors: Study of Nonlinear Optical Properties, Magnetism, and Lithium Ion Conductivity (Doctoral dissertation, Duquesne University).*

(Continued)

*Primary Examiner* — Christina Chern
(74) *Attorney, Agent, or Firm* — LADAS & PARRY LLP

(57) ABSTRACT

This disclosure relates to the manufacture an alkali metal quaternary crystalline nanomaterial. an alkali metal quaternary crystalline nanomaterial having general Formula A ($I_2$-II-IV-$VI_4$); and wherein I is sodium (Na) or lithium (Li), II and IV are Zn or Sn, and VI is a chalcogens selected from the group comprising: sulphur (S), selenium (Se) or tellurium (Te). The crystal phase of the alkali metal quaternary crystalline nanomaterial may be a primitive mixed Cu—Au like structure (PMCA) and may have a space group: $P\bar{4}2m$. The nanomaterials may be adapted to provide a solar cell. Methods of manufacture are also provided.

11 Claims, 18 Drawing Sheets

Kesterite
(a)

Stannite
(b)

PMCA
(c)

(51) Int. Cl.
    *C01G 19/00*    (2006.01)
    *H01G 9/00*    (2006.01)
    *H01G 9/20*    (2006.01)
    *B82Y 20/00*    (2011.01)
    *B82Y 40/00*    (2011.01)

(52) U.S. Cl.
    CPC ......... *C01G 19/006* (2013.01); *H01G 9/0029* (2013.01); *H01G 9/2059* (2013.01); *B82Y 20/00* (2013.01); *B82Y 40/00* (2013.01); *C01P 2002/72* (2013.01); *C01P 2002/77* (2013.01); *C01P 2002/82* (2013.01); *C01P 2002/86* (2013.01); *C01P 2004/04* (2013.01); *C01P 2004/64* (2013.01); *C01P 2006/40* (2013.01)

(56) References Cited

OTHER PUBLICATIONS

Zhang et al. ("Infrared nonlinear optical properties of lithium-containing diamond-like semiconductors Li2ZnGeSe4 and Li2ZnSnSe4"), Dalton Trans. 2015, 44, 11212-11222.*

Chen et al. ("Electronic structure and stability of quarternary chalcogenide semiconductors derived from cation cross-substitution of II-VI and I-III-12 compounds"), Physical Review B 79, 165211 (2009).*

International Search Report of Application No. PCT/IB2021/052050 mailed Jul. 14, 2021.

Written Opinion of Application No. PCT/IB2021/052050 mailed Jul. 14, 2021.

Ajay Singh, etal: "Ajay Singh et al., Colloidal Synthesis of Wurtzite Cu2ZnSnS4 Nanorods and Their Perpendicular Assembly", Journal of the American Chemical Society, (Feb. 15, 2012), vol. 134, No. 6, doi:10.1021/ia2112146, ISSN 1520-5126, pp. 2910-2913, XP055145184, DOI: http://dx.doi.org/10.1021/ja2112146.

Mundher Al-Shakban, et al.: "The synthesis and characterization of Cu2ZnSnS4thin films from melt reactions using kanthate precursors", Jul. 20, 2017 (Jul. 20, 2017), vol. 52, No. 21, p. 12761-12771, XP036296796 DOI: 10.1007/S10853-017-1367-0 external link ISSN:0022-2461, [retrieved on Jul. 20, 2017] the whole document.

Zhengqi Shi, et al.: "Kesterite-based next generation high performance thin film solar cell: current progress and future prospects", Oct. 3, 2016 (Oct. 3, 2016), vol. 28, No. 2, p. 2290-2306, XP036285622 DOI: 10.1007/S10854-016-5753-1 external link, ISSN:0957-4522, [retrieved on Oct. 3, 2016], the whole document.

* cited by examiner

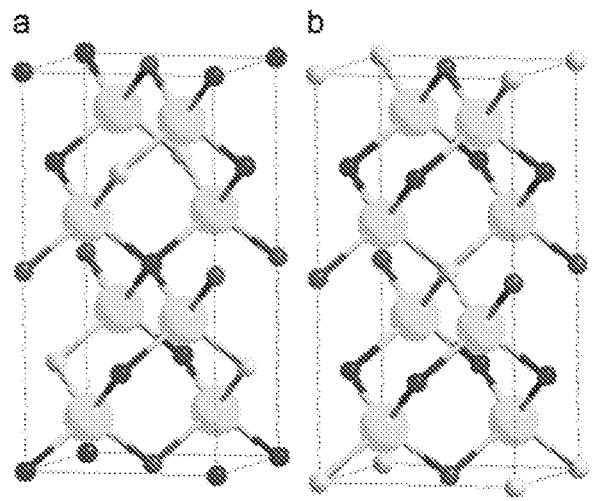
Fig. 1 (a) and (b)
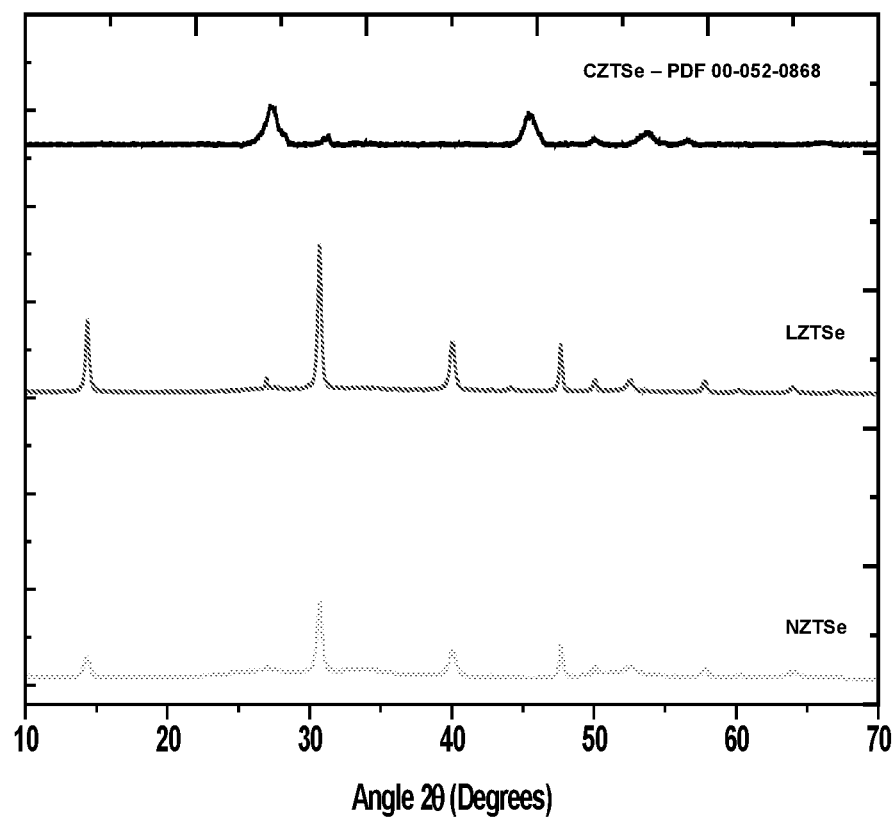
Fig. 2

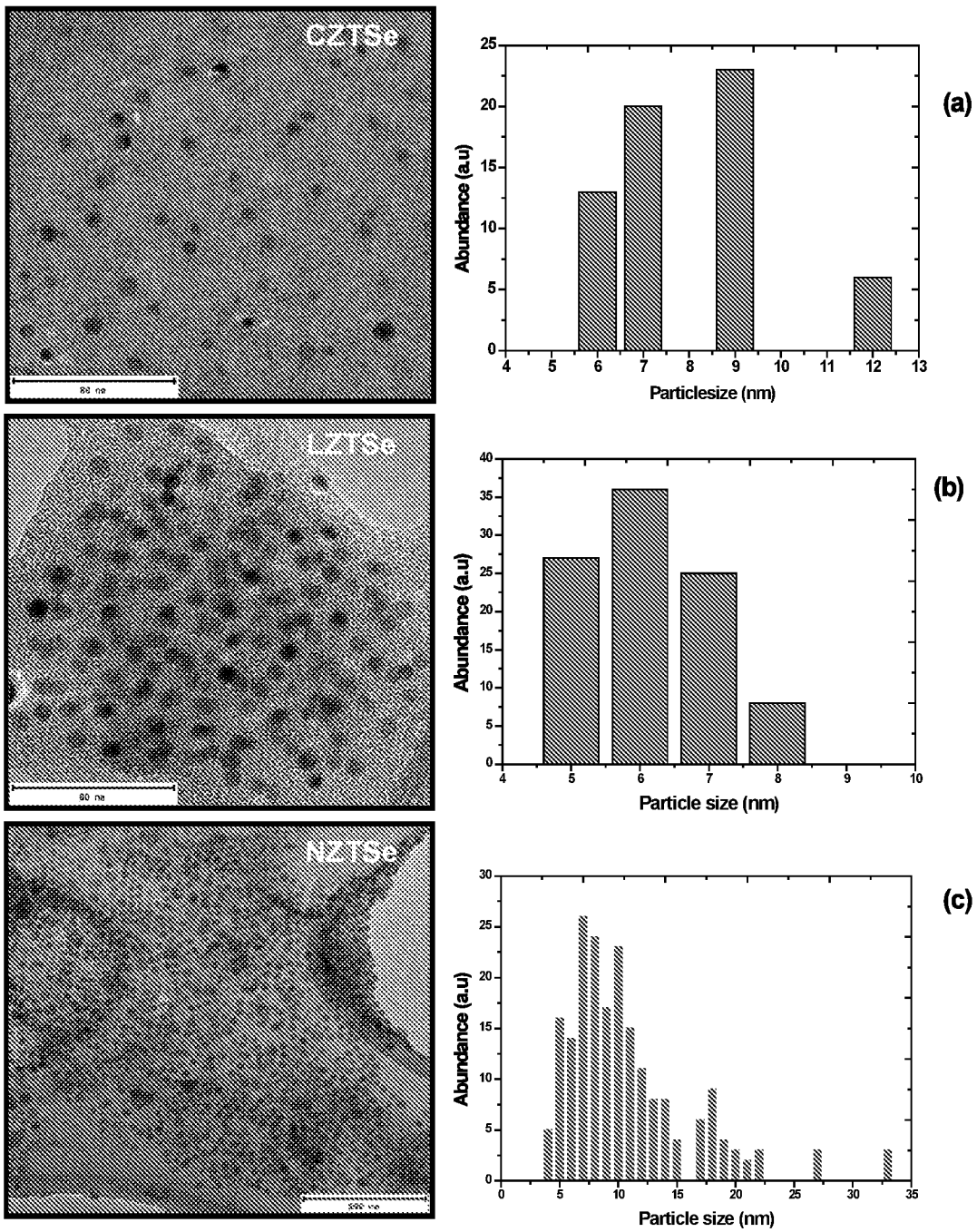
Fig. 4 (a) to (c)

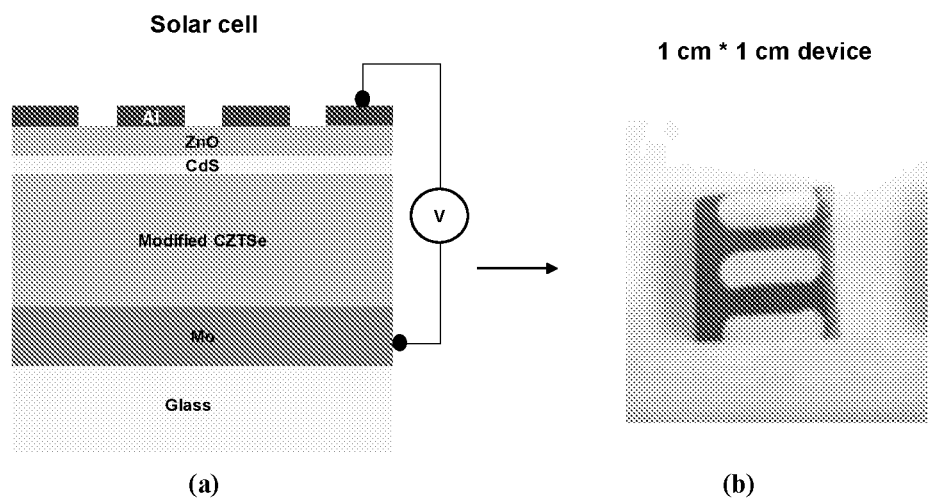
Fig. 5 (a) and (b)
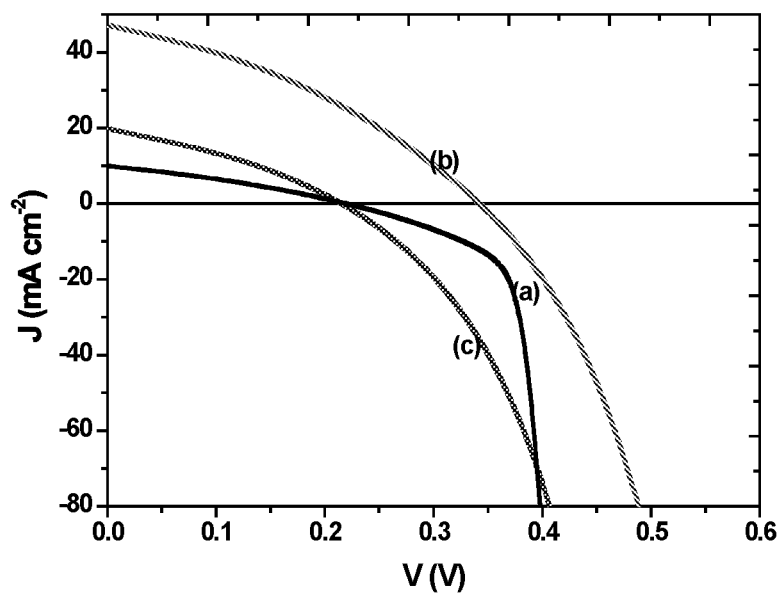
Fig. 6 (a) to (c)

Fig. 8 (a) to (c)

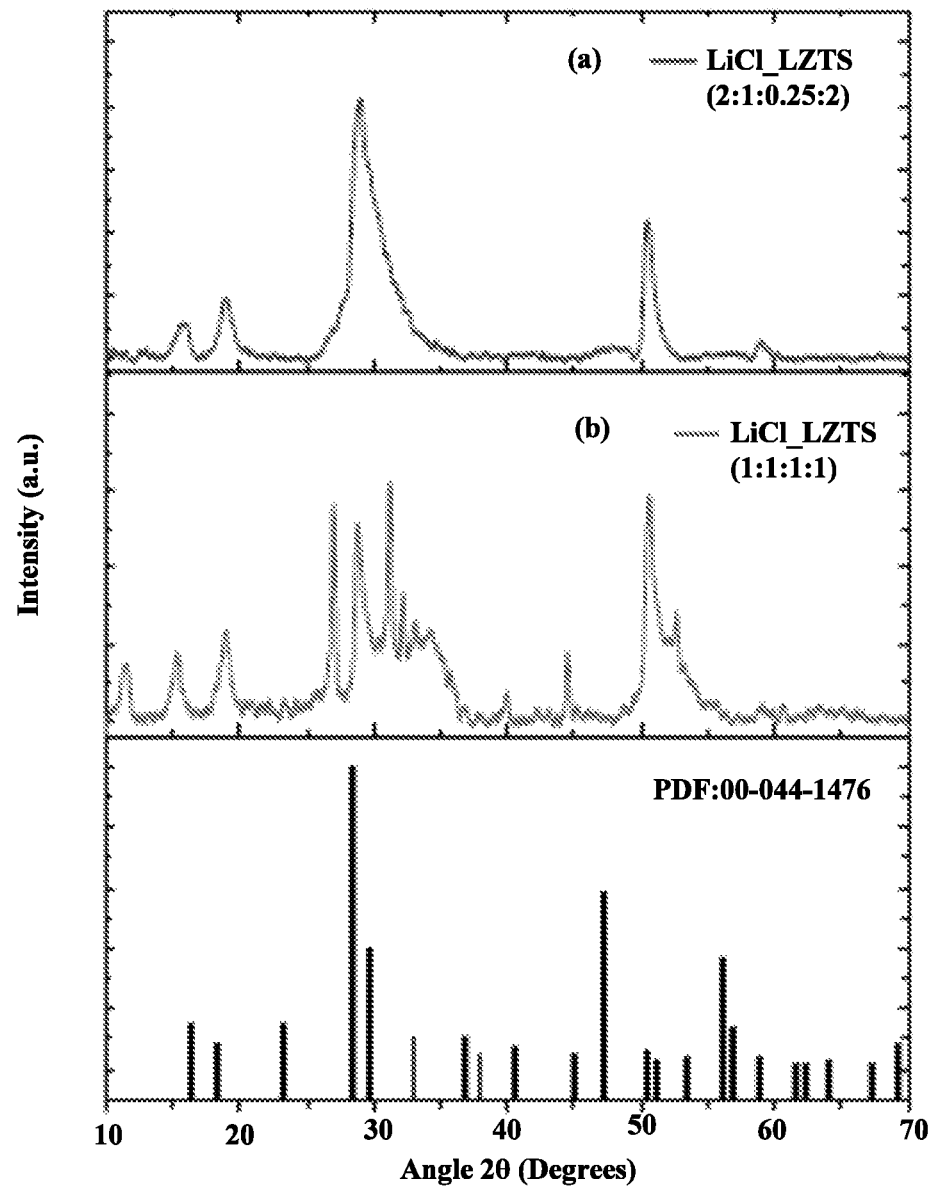
Fig. 9 (a) and (b)

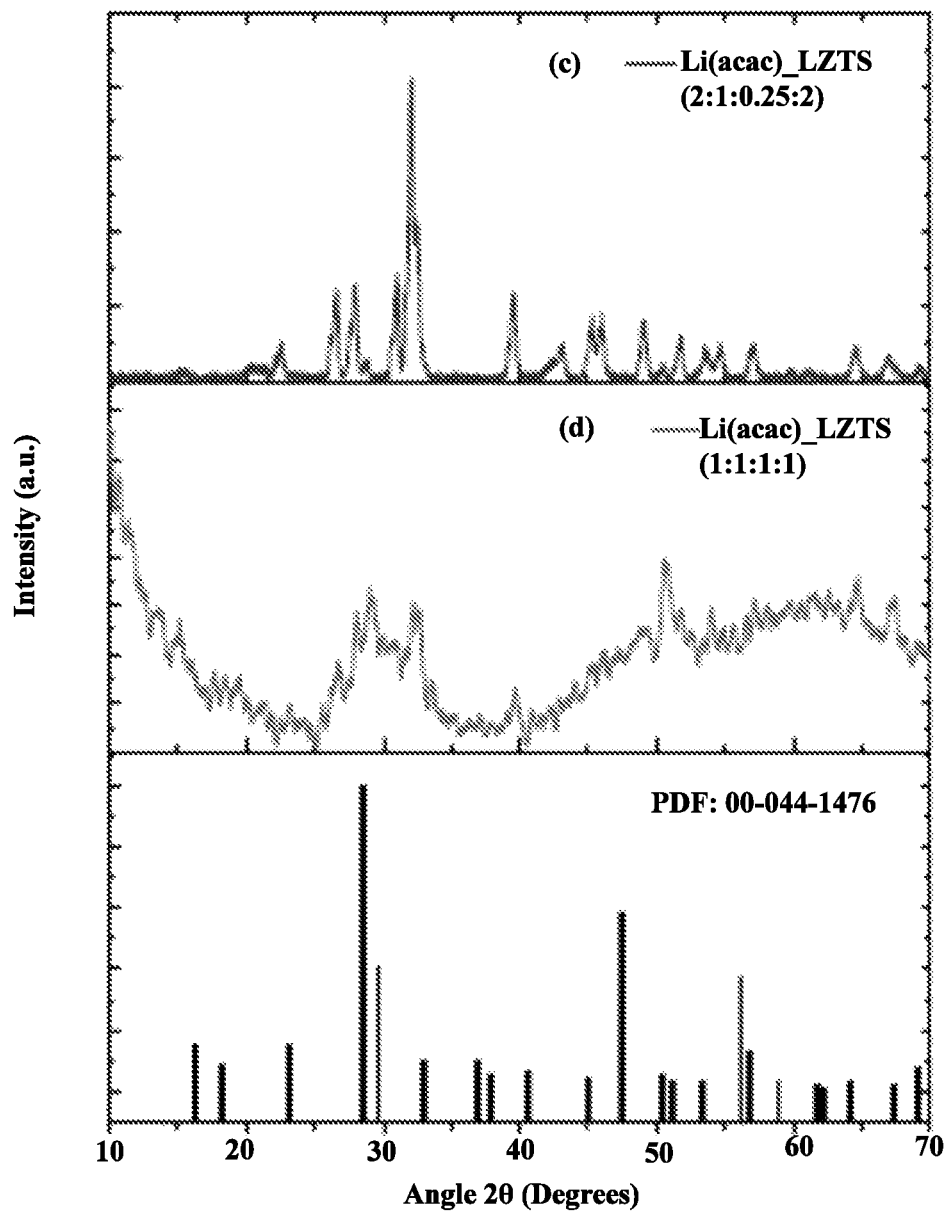
Fig. 9 (c) and (d)

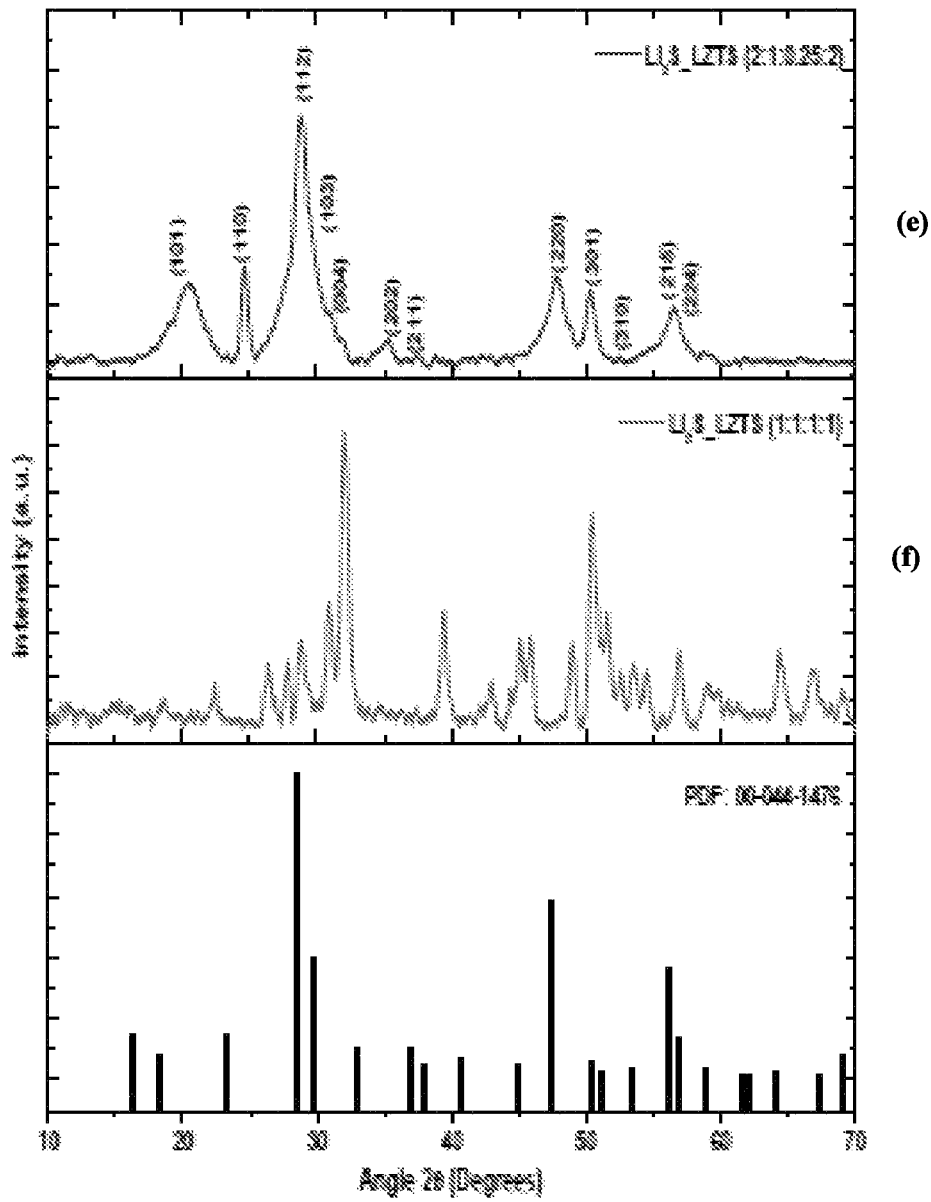
Fig. 9 (e) and (f)

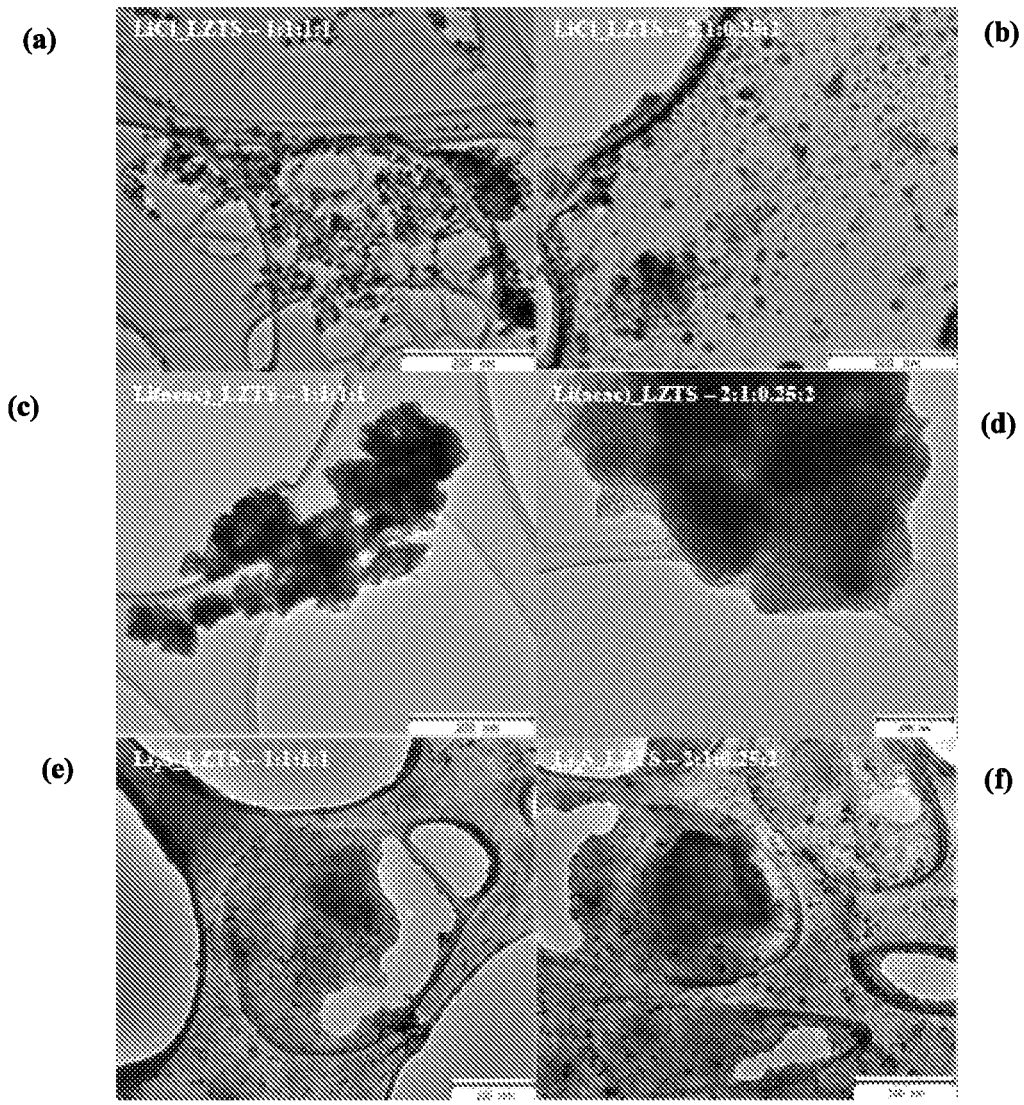
Fig. 10 (a) to (f)

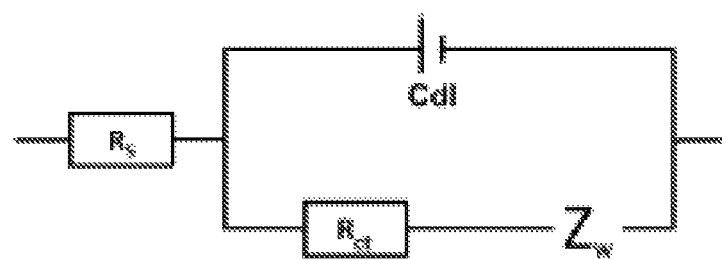
Figure 14 (c)
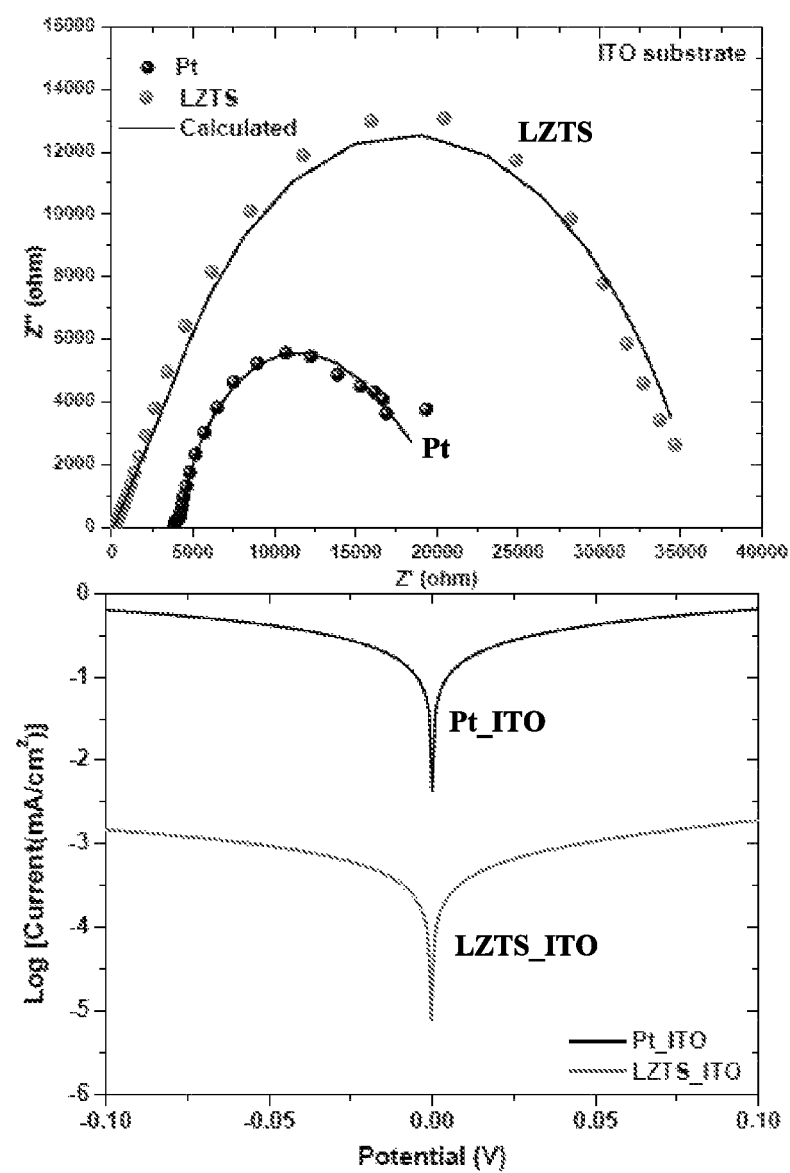
Figure 15 (a) and (b)

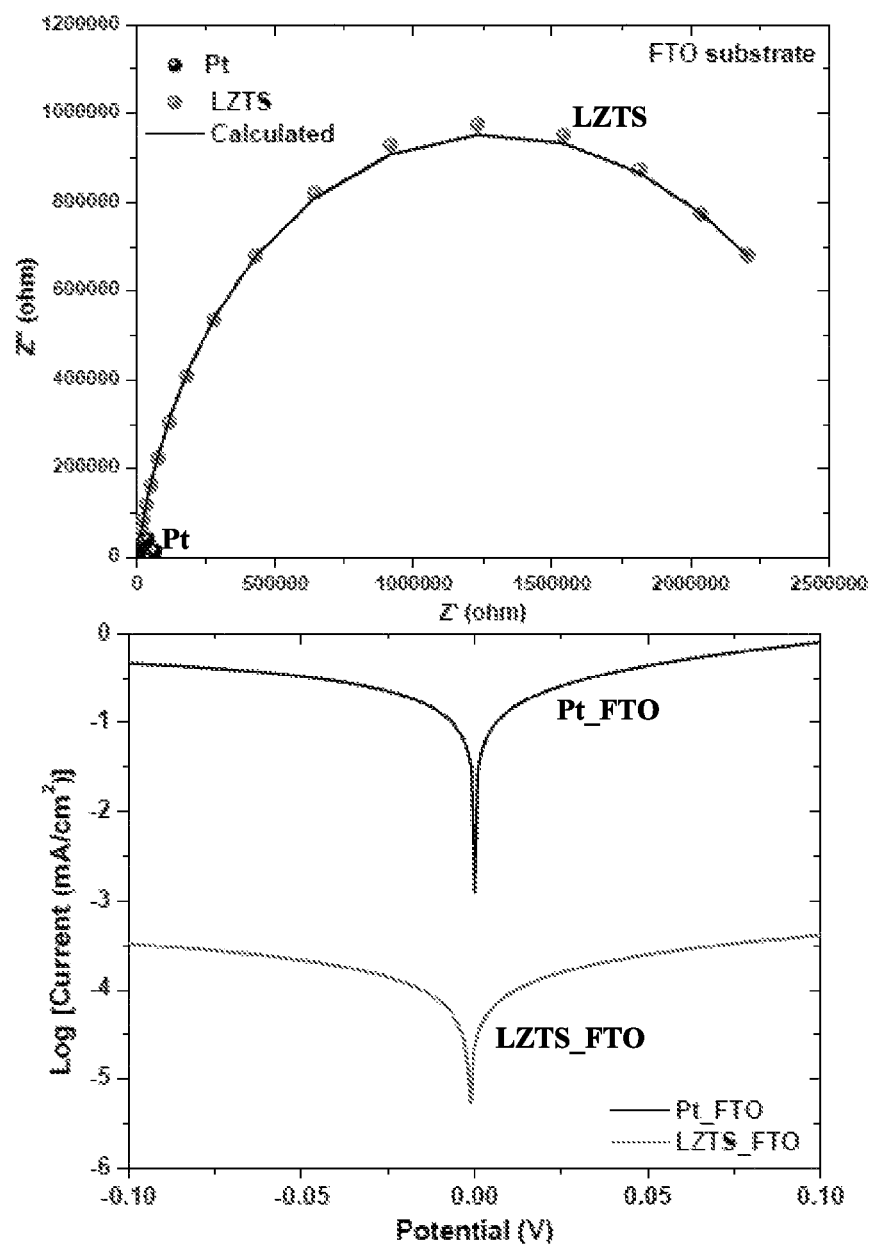
Figure 15 (c) and (d)
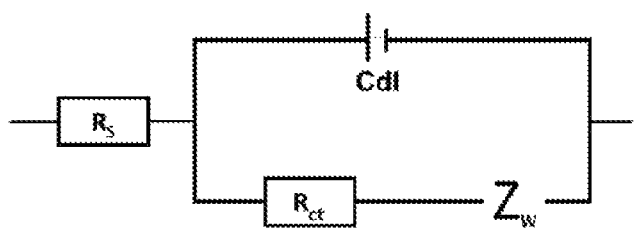
Figure 15 (e)

ALKALI METAL QUATERNARY NANOMATERIALS

RELATED APPLICATION

This application is an application under 35 U.S.C. 371 of International Application No. PCT/IB2021/052050 filed on 11 Mar. 2021, which claims priority from South African Application No. 2020/01521 filed 11 Mar. 2020 the disclosures of which are incorporated in their entirety by reference herein.

FIELD OF DISCLOSURE

This disclosure relates to the manufacture an alkali metal quaternary crystalline nanomaterial.

BACKGROUND

The provision of a constant and reliable electricity supply in rural locations and informal settlements not connected to a formal electrical grid within an African and developing world context remains a constant challenge. In particular, providing lighting is often a major challenge.

Lack of appropriate infrastructure necessitates the use of candles and kerosene lamps in many cases. This presents both a safety and health risk. Innovative and cost-effective solutions are required to ameliorate this problem.

Solar based electricity solutions have been widely investigated in order to provide greater access to, and consistent supply of, electricity. Of particular importance is the ability to provide a relatively small sized solar panel that is effective and affordable to manufacture such that in use it can be transported readily to remote areas and provide a reliable electricity supply. In recent years, thin film photovoltaics have been investigated to provide an efficient solar solution.

Particularly, quaternary materials have shown promise including kesterite-based structures having the general formula $I_2$-II-IV-VI$_4$. Efficiencies for kesterite-based thin film solar cells have been up to 12.6% but have remained stagnant.

The primary technical problem with existing kesterite-based thin film solar cells is the open-circuit voltage ($V_{oc}$) deficit. The $V_{oc}$ deficit is the presence of many defects and/or disorder within the crystal structure. These have an influence on the electronic band structure of the absorber and hence result in limited solar power conversion efficiency. Although other quaternary materials have been synthesised it has been shown that preservation of a kesterite-based structure is advantageous and outperforms other structures such as stannite-based structures.

Typically, there has been a focus on transition metals in kesterites, typically copper containing kesterites such as $Cu_2ZnSnSe_4$ (CZTSe). Transition metal chemistry is very peculiar and in order to avoid a change in the kesterite-based structure into another crystal form, kesterite prior art variations have merely included minimal doping with other metals in order to improve the limiting inefficiencies described. However, excessive doping risked an alternation in space group which would negatively impact on efficiencies. Kesterites belong to the $\overline{I4}$ space group having a peculiar packing arrangement that facilitates its physicochemical properties when in use. The prior art teaches away from altering the kesterite crystal phase as the particular crystal phase has been shown to provide the efficiencies in use.

Further, known synthetic methods of quaternary material production use harsh synthetic conditions, are difficult to reproduce, and once synthesized are not compactible to conform to the fabrication method of quaternary solar cells which requires solution-based synthetic techniques.

There is a need for new innovative nanomaterials for use in the solar or sustainable energy economy. There is also a need for synthetic methods that are less harsh, more cost effective and less time consuming.

SUMMARY

In accordance with a first aspect of this disclosure there is provided an alkali metal quaternary crystalline nanomaterial having general Formula A
wherein Formula A is $I_2$-II-IV-VI$_4$;
and wherein I may be sodium (Na) or lithium (Li)
and wherein II and IV may be transition metals;
and wherein VI may be chalcogens including sulphur (S), selenium (Se) or tellurium (Te);
and wherein a crystal phase of the crystalline nanomaterial may not be kesterite and/or stannite.

The alkali metal quaternary crystalline nanomaterial wherein the crystal phase of the nanomaterial may be a primitive mixed Cu—Au like structure (PMCA) (having space group: P$\overline{4}$2m).

The alkali metal quaternary crystalline nanomaterial, wherein in Formula A, I may be Li, II may be Zn, IV may be Sn and VI may be Se, such that the nanomaterial may be $Li_2ZnSnSe_4$ (LZTSe), and wherein the crystal phase of the nanomaterial may be primitive mixed Cu—Au like structure (PMCA), and wherein the nanomaterial may have a space group: P$\overline{4}$2m.

The alkali metal quaternary crystalline nanomaterial, wherein in Formula A, I may be Na, II may be Zn, IV may be Sn and VI may be Se, such that the nanomaterial may be $Na_2ZnSnSe_4$ (NZTSe), and wherein the crystal phase of the nanomaterial may be primitive mixed Cu—Au like structure (PMCA), and wherein the nanomaterial may have a space group: P$\overline{4}$2m.

The alkali metal quaternary crystalline nanomaterial, wherein in Formula A, I may be Li, II may be Zn, IV may be Sn and VI may be S, such that the nanomaterial may be $Li_2ZnSnSe_4$ (LZTS), and wherein the crystal phase of the nanomaterial may be primitive mixed Cu—Au like structure (PMCA), and wherein the nanomaterial may have a space group: P$\overline{4}$2m.

The alkali metal quaternary crystalline nanomaterial, wherein in Formula, A I may be Na, II may be Zn, IV may be Sn may be VI is S, such that the nanomaterial may be $Na_2ZnSnS_4$ (NZTS), and wherein the crystal phase of the nanomaterial may be primitive mixed Cu—Au like structure (PMCA), and wherein the nanomaterial may have a space group: P$\overline{4}$2m.

The alkali metal quaternary crystalline nanomaterial may be $Li_2ZnSnSe_4$ (LZTSe), wherein the crystal phase may not be kesterite and/or stannite, and may be primitive mixed Cu—Au like structure (PMCA) (having space group: P$\overline{4}$2m).

The alkali metal quaternary crystalline nanomaterial may be $Na_2ZnSnSe_4$ (NZTSe), wherein the crystal phase may not be kesterite and/or stannite, and may be primitive mixed Cu—Au like structure (PMCA) (having space group: P$\overline{4}$2m).

The alkali metal quaternary crystalline nanomaterial may be $Li_2ZnSnS_4$ (LZTS), wherein the crystal phase may not be kesterite and/or stannite, and may be primitive mixed Cu—Au like structure (PMCA) (having space group: P$\bar{4}$2m).

The alkali metal quaternary crystalline nanomaterial may be Na$_2$ZnSnS$_4$ (NZTS), wherein the crystal phase may not be kesterite and/or stannite, and may be primitive mixed Cu—Au like structure (PMCA) (having space group: P$\bar{4}$2m).

The alkali metal quaternary crystalline nanomaterial according to this disclosure may be provided as nanoparticles.

The alkali metal quaternary crystalline nanomaterial may be adapted to provide solar photovoltaic cells.

The Applicant was surprised to provide an alkali metal quaternary crystalline nanomaterial of general Formula A, wherein the crystal phase is not kesterite or stannite. The unique solid-state nature of the alkali metal quaternary crystalline nanomaterials of this disclosure provide enhanced physico-chemical properties. Without being limited to theory, the enhanced physico-chemical properties may be due to quantum confinement effects facilitated by the unique crystal structure, and/or size and/or morphology of the alkali metal quaternary crystalline nanomaterials described herein.

In accordance with a second aspect of this disclosure there is provided a method for chemical synthesis of an alkali metal quaternary crystalline nanomaterial having general Formula A as described in the first aspect of this disclosure, the method comprising the following steps:

VI selected from the group: sulphur (S), selenium (Se) or tellurium (Te) is dissolved in an amphiphilic capping agent under inert conditions to form a first solution;

a solvent is heated under reflux to about between 75° C. and about 120° C., preferably about 100° C., to form a second solution;

the first and second solution are admixed and heated to about between 120° C. and about 220° C., preferably about 200° C., to form a third solution;

dissolving at least one of the group: CuCl, LiCl, Li(acac), Li$_2$S and NaCl in amphiphilic capping agent to form a fourth solution;

adding the fourth solution to the third solution forming a fifth solution;

adding at least one of zinc chloride or tin chloride into the fifth solution to form a sixth solution;

allowing the sixth solution remain heated at about between 120° C. and about 220° C., preferably about 200° C., for between 30 min to 2 hours, preferably 1 hour.

The method may further include the step of adding a flocculation agent, preferably alcohol.

The method may further include the step of washing off excess capping agent.

The method may further include the step of centrifugation to provide for collection of the alkali metal quaternary crystalline nanomaterial.

The capping agent may be one of the following group: hexadecylamine, oleic acid, trioctylphosphine oxide, and oleylamine.

The solvent may be one of the following group: hexadecylamine, oleic acid, trioctylphosphine oxide, and oleylamine. It is to be understood that the capping agent may include at least four roles when in use: it may cap the nanoparticles; it may control growth of crystalline nanomaterials; it may provide a high boiling solvent; and it may provide a reductant.

In accordance with a third aspect of this disclosure there is provided a solar cell comprising a substrate having applied thereto the alkali metal quaternary crystalline nanomaterial of the first aspect.

The substrate may be molybdenum coated glass.

The alkali metal quaternary crystalline nanomaterial may be applied to the substrate by means of coating, preferably spin coating.

The solar cell may further include a CdS coating.

The solar cell may further include a ZnO coating.

The solar cell may further include Al.

Typically, the solar cell is provided as a layered arrangement, preferably layered like a sandwich.

In accordance with a fourth aspect of this disclosure there is provided a method for the manufacture of a solar cell of the third aspect, the method including:

(i) providing a solution of the alkali metal quaternary crystalline nanomaterials of the first aspect in a solvent, preferably toluene;

(ii) coating, preferably spin coating, the alkali metal quaternary crystalline nanomaterials solution onto a molybdenum coated glass substrate forming an alkali metal quaternary crystalline nanomaterial coated substrate;

(iii) drying the alkali metal quaternary crystalline nanomaterial coated substrate at about between 60° C. and 80° C.;

(iv) providing a solution of CdS in a solvent, preferably toluene;

(v) coating, preferably spin coating, the dried alkali metal quaternary crystalline nanomaterial coated substrate with CdS solution to provide a CdS coated substrate; and (vi) coating, preferably spin coating, ZnO onto the CdS coated substrate.

In a preferred embodiment, the method of manufacture is conducted in the sequence provided above to provide sandwich layered arrangement.

The method may further include the step of spluttering onto the CdS coated substrate aluminium, preferably under thermal evaporation in high vacuum. There is further provided for any one of the first to the fourth disclosures substantially as herein described, illustrated and/or exemplified with reference to any one of the examples and/or figures herein.

BRIEF DESCRIPTION OF DRAWINGS

FIG. 1 shows crystal structures of prior art CZTSe, (a) kesterite and (b) stannite;

FIG. 2 shows XRD patterns of CZTSe and LZTSe and NZTSe according to the disclosure;

FIG. 4 shows TEM images of (a) CZTSe, (b) LZTSe and (c) NZTSe;

FIG. 5 shows solar cell design of the solar cell according to the disclosure in (a) diagrammatic form and (b) as a photograph of a prepared example embodiment;

FIG. 6 shows J-V curves of (a) CZTSe, (b) LZTSe and (c) NZTSE derived devices;

FIG. 8 shows (a) kesterite, (b) stannite, and (c) PMCA structures for LZTS;

FIG. 9 shows X-ray diffraction patterns of LZTS nanoparticles synthesized using different lithium sources (LiCl, Li(acac), Li$_2$S) at different precursor ratios (1:1:1:1 and 2:1:0.25:2), wherein (a) shows LiCl at 1:1:1:1 (b) shows LiCl at 2:1:0.25:2 (c) shows Li(acac) at 1:1:1:1. (d) shows Li(acac) at 2:1:0.25:2, (e) shows Li$_2$S at 1:1:1:1 and (f) shows Li$_2$S at 2:1:0.25:2;

FIG. 10 shows TEM micrographs of LZTS nanoparticles synthesized using different lithium sources (LiCl, Li(acac), Li$_2$S) at different precursor ratios (1:1:1:1 and 2:1:025:2), wherein (a) shows LiCl at 1:1:1:1 (b) shows LiCl at 2:1:0.25:2 (c) shows Li(acac) at 1:1:1:1, (d) shows Li(acac) at 2:1:0.25:2, (e) shows Li$_2$S at 1:1:1:1 and (f) shows Li$_2$S at 2:1:0.25:2;

FIG. 15 shows at (a) and (b) Nyquist plots of EIS for the symmetric cells with Pt and LZTS on ITO and FTO substrates, at (c) and (d) Tafel plots of Pt and LZTS electrodes on ITO and FTO substrates; and (e) the electrochemical equivalent circuit

DETAILED DESCRIPTION

Figure 3:
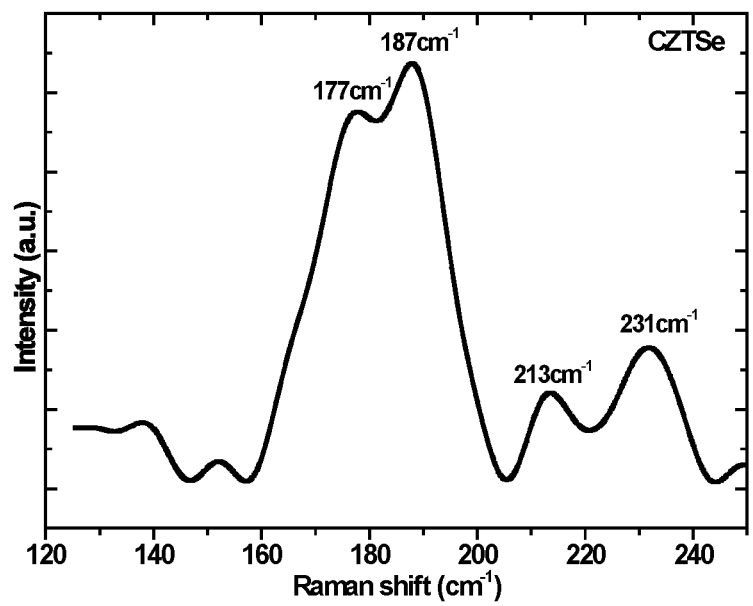
FIG. 3 shows Raman spectra of (a) CZTSe, (b) LZTSe and (c) NZTSe.
Figure 3:
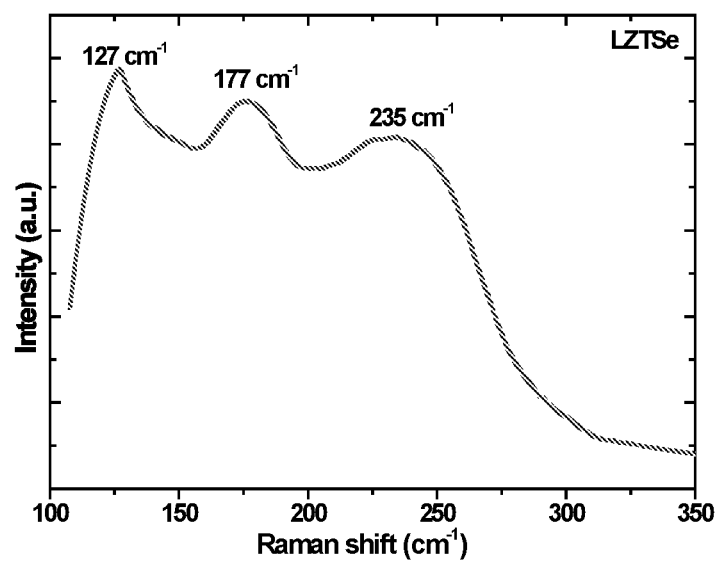
Figure 3:
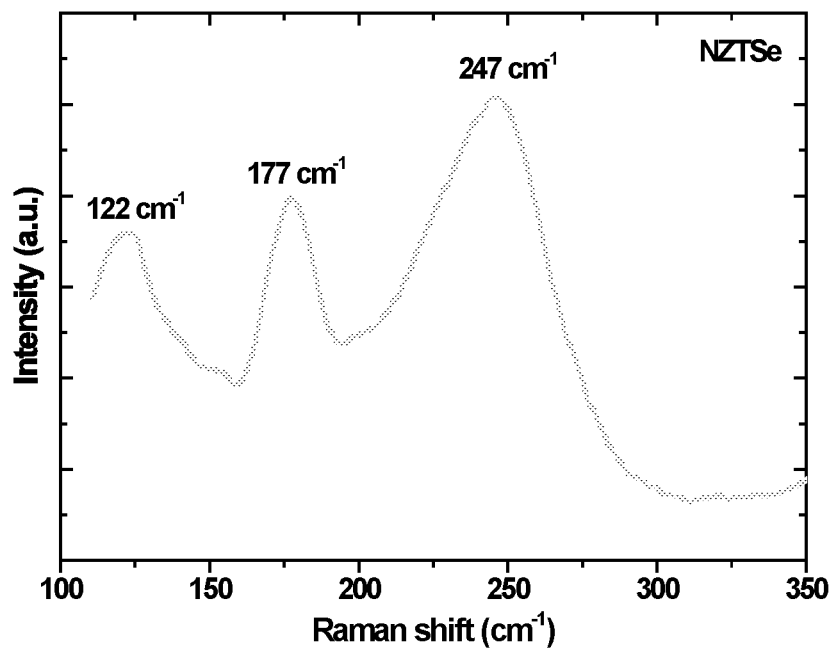

The general provisions of the Summary are repeated herein by way of reference thereto and are not necessarily repeated in full to avoid repetition. The detailed description and examples herein below will include particular embodiments of this disclosure and should not be considered as limiting in any way. Several alternatives may be envisioned by a person skilled in the art which does not depart from the scope of this disclosure.

In accordance with a first aspect of this disclosure there is provided an alkali metal quaternary crystalline nanomaterial having general Formula A (I$_2$-II-IV-VI$_4$);

and wherein I is sodium (Na) or lithium (Li), II and IV are Zn or Sn, and VI is a chalcogens selected from the group comprising: sulphur (S), selenium (Se) or tellurium (Te).

The crystal phase of the alkali metal quaternary crystalline nanomaterial according to this disclosure is not kesterite and/or stannite. The crystal phase of the alkali metal quaternary crystalline nanomaterial may be a primitive mixed Cu—Au like structure (PMCA) (having space group: P$\bar{4}$2m).

Preferably, the alkali metal quaternary crystalline nanomaterial is Li$_2$ZnSnSe$_4$ (LZTSe), wherein the crystal phase is a primitive mixed Cu—Au like structure (PMCA) (having space group: P$\bar{4}$2m), or the alkali metal quaternary crystalline nanomaterial is Na$_2$ZnSnSe$_4$ (NZTSe), wherein the crystal phase is a primitive mixed Cu—Au like structure (PMCA) (having space group: P$\bar{4}$2m).

In a further embodiment, the alkali metal quaternary crystalline nanomaterial is Li$_2$ZnSnS$_4$ (LZTS), wherein the crystal phase is a primitive mixed Cu—Au like structure (PMCA) (having space group: P$\bar{4}$2m), or the alkali metal quaternary crystalline nanomaterial is Na$_2$ZnSnS$_4$ (NZTS), wherein the crystal phase is a primitive mixed Cu—Au like structure (PMCA) (having space group: P$\bar{4}$2m).

It is to be understood that the alkali metal quaternary crystalline nanomaterial may be adapted to provide solar photovoltaic cells, the method of manufacture being provided hereunder as an example.

In accordance with a second aspect of this disclosure there is provided a method for chemical synthesis of an alkali metal quaternary crystalline nanomaterial having general Formula A as described in the first aspect of this disclosure, the method comprising the following steps:

(i) VI$_4$ selected from the group: sulphur (S), selenium (Se) or tellurium (Te) is dissolved in an amphiphilic capping agent under inert conditions to form a first solution;

(ii) a solvent is heated under reflux to about between 75° C. and about 120° C., preferably about 100° C., to form a second solution;

(iii) the first and second solution are admixed and heated to about between 120° C. and about 220° C., preferably about 200° C., to form a third solution;

(iv) dissolving at least one of the group: CuCl, LiCl, Li(acac), Li$_2$S and NaCl in amphiphilic capping agent to form a fourth solution;

(v) adding the fourth solution to the third solution forming a fifth solution;

(vi) adding at least one of zinc chloride or tin chloride into the fifth solution to form a sixth solution;

(vii) allowing the sixth solution remain heated at about between 120° C. and about 220° C., preferably about 200° C., for between 30 min to 2 hours, preferably 1 hour.

The method typically further includes the step of adding a flocculation agent, preferably alcohol. The method typically further includes the step of washing off excess capping agent.

The method further includes the step of centrifugation to provide for collection of the alkali metal quaternary crystalline nanomaterial.

A preferred method of manufacture is provided in the examples herein below.

In accordance with a third aspect of this disclosure there is provided a solar cell comprising a substrate having applied thereto the alkali metal quaternary crystalline nanomaterial of the first aspect.

The substrate may be molybdenum coated glass. To the molybdenum coated glass there is added in layered format the alkali metal quaternary crystalline nanomaterial, CdS, ZnO and finally a splurtering of Al. The layered format takes the form of a sandwich which is preferred.

In accordance with a fourth aspect of this disclosure there is provided a method for the manufacture of a solar cell of the third aspect, the method including:

(i) providing a solution of the alkali metal quaternary crystalline nanomaterials of the first aspect in a solvent, preferably toluene;

(ii) coating, preferably spin coating, the alkali metal quaternary crystalline nanomaterials solution onto a molybdenum coated glass substrate forming an alkali metal quaternary crystalline nanomaterial coated substrate;

(iii) drying the alkali metal quaternary crystalline nanomaterial coated substrate at about between 60° C. and 80° C.;

(iv) providing a solution of CdS in a solvent, preferably toluene;

(v) coating, preferably spin coating, the dried alkali metal quaternary crystalline nanomaterial coated substrate with CdS solution to provide a CdS coated substrate; and (vi) coating, preferably spin coating, ZnO onto the CdS coated substrate.

In a preferred embodiment, the method of manufacture is conducted in the sequence provided above to provide sandwich layered arrangement. The method may further include the step of spluttering onto the CdS coated substrate aluminium, preferably under thermal evaporation in high vacuum. A preferred method is described hereunder in the examples.

Non-limiting examples are provided hereunder to illustrate and exemplify preferred embodiments of this disclosure.

EXAMPLES

Example 1—$Li_2ZnSnSe_4$ (LZTSe) and $Na_2ZnSnSe_4$ (NZTSe)

Chemicals

Copper chloride (CuCl), lithium chloride (LiCl), sodium chloride (NaCl), zinc chloride ($ZnCl_2$), stannic chloride ($SnCl_4 \cdot 5H_2O$)), elemental selenium, oleylamine (OLA), ethanol and toluene were purchased from Sigma-Aldrich and used without any further purification.

Synthesis of the Nanocrystals

In a three-neck round bottom flask, 15 mL of capping agent (OLA) was added followed by purging of nitrogen gas to afford inert conditions. Under reflux and strong magnetic stirring, the solvent was heated to 100° C. followed by addition of 4 mmol selenium dissolved in the capping agent, the temperature was further raised to 200° C. and at this point 2 mmol CuCl/LiCl/NaCl also dissolved in the capping agent was subsequently added followed by the addition of 1 mmol of zinc and tin chloride. The reaction was carried out at 200° C. and allowed to run for 1 hour. Ethanol was added to flocculate the particles as well as to wash off excess capping agent. The nanocrystals were then collected by centrifugation and were left to dry at room temperature before characterization.

Characterization Techniques

A Bruker D2 phaser (D2-205530) diffractometer using secondary graphite monochromated CuKα radiation (λ 1.5418 Å) at 30 kV and 10 mA was used to measure powder XRD patterns on the as-synthesized materials. Measurements were taken using a glancing angle of incidence detector at an angle of 2°, for 2θ values over 5-90° in steps of 0.036° with a step time of 0.5 s and at a temperature of 25° C.

Raman analysis was performed using a T64000 series II triple spectrometer system from HORIBA scientific, Jobin Yvon Technology. The Raman spectra were obtained using 514.5 nm argon laser, through an Olympus microscope with a 50× objective lens and laser power of 1.5 mW.

Transmission electron microscopy (TEM) was carried out on a FEI Technai T12 TEM microscope operated at an acceleration voltage of 120 kV with a beam spot size of 3 in TEM mode. The samples were initially suspended in toluene followed by placing a drop of the suspended nanomaterials on a lacey-carbon copper grid. The grid was allowed to dry at room temperature before analysis. A Varian Cary Eclipse (Cary 50) UV-Vis spectrophotometer was used to carry out the absorption measurements of the nanocrystals. The absorption spectra were obtained in toluene and placed in quartz cuvettes (1 cm path length).

Fabrication of the Solar Cells

The device assembly was made by spin coating at 300 rpm 50 μL of a toluene solution of the different nanoparticles (CZTSe, LZTS or NZTSe) on a molybdenum coated glass substrate. The formed film was allowed to dry and baked at 70° C. A toluene solution containing CdS was also spin coated at 5000 rpm to form a very thin window layer. Then a ZnO layer was spin coated at 3000 rpm. The aluminium top contact was sputtered through a shadow mask to generate an array of patterned electrodes. The Al was deposited by thermal evaporation in high vacuum. The final device area of 0.08 $cm^2$ was defined by overlap between the Mo and the Al electrodes. The photovoltaic properties such as current (I) and voltage (V) were determined using a digital source meter (Keithley Instruments Inc., Model 2400)) in the dark and under an illumination of a Newport ABA solar simulator operated at standard conditions of AM 1.5, 100 $mWcm^{-2}$.

Results and Discussion

The bulk crystal structures of prior art CZTSe and LZTSe have been previously reported in literature. CZTSe crystallizes in two primary crystalline structures known as kesterite and stannite which are tetragonal crystal systems. These two crystal structures are very similar; both have cations located at tetrahedral sites but differ in the stacking arrangement of Cu and Zn atoms along the c-axis. The crystal structure and the atomic arrangements for the kesterite and stannite structures are illustrated in FIG. 1. In kesterite structure, the cationic layers along the c-axis are arranged in Cu—Sn, Cu—Zn, Cu—Sn, and Cu—Zn fashion. One Cu atom is located at 2a position; Zn atom and the other Cu atom are located at 2d and 2c positions respectively with corresponding Madelung potentials of −15.04 V, −21.88 V, and −15.21 V. In stannite structure, a periodic arrangement of Zn—Sn cationic layer sandwiched in between Cu—Cu layers are repeated where both Cu atoms are located at 4d position and the Zn atom at 2a position with Madelung potentials of −15.30 V and −21.62 V respectively. Sn atom site is located at 2b position in both structures. Theoretical studies have predicted that the kesterite has slightly lower energy compared to the stannite phase and therefore should be thermodynamically more stable than the stannite counterpart, hence most particles crystalize in the kesterite form.

LZTSe single-crystals have been shown to crystalize with the wurtz-kesterite structure that can be considered as a superstructure of lonsdaleite, the rare hexagonal diamond. The Applicant was very surprised that the LZTSe according to this disclosure displayed a PMCA structure having a tetragonal crystal system with a P$\bar{4}$2m space group. This was surprising and unexpected. Without being limited to theory, the unique method of chemical synthesis may have provided the unexpected crystal system. It is often the combination of physical characteristics such as the crystal structure and/or size and/or morphology that provide for the unique properties when in use.

Shown in FIG. 2 are the XRD patterns of the synthesized CZTSe, LZTSe and NZTSe nanocrystals. The XRD pattern of CZTSe shows all diffraction peaks consistent with a kesterite phase (PDF 004)52-0868). Apart from the single-crystal derived x-ray diffraction pattern for LZTSe that is consistent with wurtz-kesterite, there are no other reports for LZTSe and NZTSe, however herein, the patterns are distinct from the common kesterite and stannite patterns associated with quaternary materials. In addition, the observed patterns do not match to common impurities such as ZnSe, SnSe$_2$, Li$_2$Se or Na$_2$Se. For the wurtz-kesterite phase, three peaks in the region between 20°-30° are expected however these peaks are not present in observed LZTSe and NZTSe diffractograms. The observed patterns are indicative of a PMCA like phase. This is surprising and unexpected.

To probe the structure further, Raman spectroscopy was undertaken and the results are shown in FIG. 3. The Raman spectrum of CZTSe shows the four expected peaks at 177 cm$^{-1}$, 187 cm$^{-1}$, 213 cm$^{-1}$ and 231 cm$^{-1}$ that a consistent with the kesterite phase. The Raman spectrum for LZTSe shows a distinct peak from CZTSe at lower wavenumbers (127 cm$^{-1}$) and this also seen on the NZTSe spectrum (121 cm$^{-1}$). The 235 cm-1 for LZTSe is similar to the 231 cm$^{-1}$ peak of CZTSe, although slightly shifted. A peak at 247 cm$^{-1}$ could be signifying some structural differences between LZTSe and NZTSe. The Raman results corroborates the XRD data that the LZTSe and NZTSe nanoparticles crystal structure may be PMCA. PMCA is similar to kesterite and stannite however it can be considered as a combination of two kesterite and stannite unit cells. This structure has not been observed experimentally in the prior art.

The TEM images in FIG. 4 show all the particles are spherical. The average particle sizes are 9.0±1.07 nm, 6.06±0.9 un and 8.3±2.7 nm for CZTSe, LZTSe and NZTSe respectively. The standard deviation for NZTSe particles is slightly greater that CZTSe and LZTSe particles suggestion a more polydispersed sample. Nevertheless, all particles are below 10 nm and are mostly likely influenced by quantum confinement effects.

Nanocrystals for solar cell application can result in unique properties different from bulk materials such as multiple exciton generation and hot carrier injection which all desirable properties. The as-synthesized nanocrystals were then used to fabricate solar cells with the configuration shown in FIG. 5. Solution processing was used for the different layers and the Al electrode was sputter coated. The device area corresponding to the connection between the Mo electrode and Al strip was 0.08 cm$^2$. Patterning the electrodes result in arrays of small devices therefore maximizing the output of the solar cells by minimizing defects.

Current density-voltage (J-V) curves generated by the solar cells are shown in FIG. 6, J-V curves can be used to evaluate the performance of a solar cell and important parameters can be extracted and can be used to calculate the efficiency using the equations below:

$$P_{max} = V_{oc}J_{sc}FF \quad (1)$$

$$\eta = \frac{P_{max}}{P_{in}} \quad (2)$$

Where V$_{oc}$ is the open circuit voltage, J$_{sc}$ is the short circuit current and FF is the fill factor. The solar cells were evaluated using the standard illumination conditions of AM 1.5 and 100 mWcm$^{-2}$.

The extracted parameters are shown in Table 1. The bandgap of the synthesized materials were determined using UV-Vis absorption spectroscopy. The similar devices referenced herein did not provide the exact band gap for the materials however generally the band gap of CZTSe has been reported to be between 1.03-1.5 eV. Herein, the respective band gaps were 1.03 eV, 1.91 eV and 1.59 eV for CZTSe, LZTSe and NZTSe. These are firmly in the visible region of the solar spectrum. Reducing the size of LZTSe and NZTSe will shift the band gap towards the desired Shockley Queisser Efficiency Limit that occurs at 1.34 eV. The Shockley Queisser Efficiency Limit refers to the maximum theoretical efficiency of a solar cell using a single p-n junction to collect power from the cell.

TABLE 1

Solar cell parameters

| Sample | Band gap (eV) | Jsc (mA cm$^{-2}$) | Voc (mV) | FF (%) | PCE (%) |
|---|---|---|---|---|---|
| CZTSe | 1.03 | 9.7 | 397 | 19 | 0.73 |
| LZTSe | 1.91 | 46.9 | 486 | 25 | 5.65 |
| NZTSe | 1.59 | 19.5 | 405 | 20 | 1.58 |
| CZTSe [16] | — | 38.5 | 433 | 64 | 10.7 |
| CZTSe [17] | — | 38.7 | 423 | 61.9 | 10.1 |

The fabricated CZTSe solar cell showed lower J$_{sc}$, V$_{oc}$ and FF values thus the efficiency compared to the reported CZTSe devices. Nevertheless, using the same fabrication conditions. NZTSe and LZTSe in particular shows improved results compared to the CZTSe. The Jsc and Voc (46.9 mAcm$^{-2}$ and 486 mV for LZTSe and 19.5 mAcm$^{-2}$ and 405 mV for NZTSe) which are intrinsic properties of the absorber layer are much higher than even the reported CZTSe devices. This shows the alkali metal quaternary crystalline nanomaterial according to this disclosure ameliorate the open-circuit voltage (V$_{oc}$) deficit known in the prior art. This is an unexpected and surprising step forward.

TABLE 2

Effect of improving the FF on the efficiency

| Sample | Jsc (mA cm$^{-2}$) | Voc (mV) | FF (%) | PCE (%) |
|---|---|---|---|---|
| LZTSe | 46.9 | 486 | 60 | 18.95 |
| NZTSe | 19.5 | 405 | 60 | 4.74 |
| CZTSe [16] | 38.5 | 433 | 64 | 10.7 |
| CZTSe [17] | 38.7 | 423 | 61.9 | 10.1 |

The FF in this case can be increased by improving the quality and thickness of the active layer. From the device in FIG. 5, the defects in the film coating could be visible seen. This is common when using less viscous solvents such as toluene as the spin coating medium. As subsequent layers are added, they re-dissolve the underlying layer as no good adhesion to the substrate is achieved. This causes pin-holes in the device therefore shorting which lowers the shunt resistance. Table 2 shows the effect of increasing the FF to 60% which is achievable values for kesterite solar cells as also seen in the literature. By increasing the FF of the LZTSe solar cell in particular, will result in a drastic increase in efficiency more than threefold from 5.65% to 18.95%. This is far above any reported lab-scale kesterite nanocrystal solution based solar cell device.

Example 2—Li$_2$ZnSnS$_4$ (LZTS)

Experimental Section

Materials

Lithium chloride (LiCl, 99.98%), lithium acetylacetonate (Li(acac), 99.95%), lithium sulfide (LiS, 99.98%), zinc chloride (ZnCl$_2$, 98%), stannic chloride (SnCl$_4$·5H$_2$O, 97.5%), elemental sulfur (S, ≥99%), oleylamine (OLA, 70%), methanol (96%), ethanol (96%), toluene (anhydrous, 95%), hexane (anhydrous 95%), isopropanol (anhydrous, 99%), lithium perchlorate (≥95%), lithium iodide (99.9%), sodium iodide (anhydrous, ≥99.9%), 4-tert-butylpyridine (98%), N-methyl-2-pyrrolidone (anhydrous NMP, 99.5%), white titania paste reflector ($TiO_2$, 20.0 wt %), Whatman™ glass microfiber filter paper, indium doped tin oxide coated glass slide (surface resistivity ~8-12 Ω/sq), fluorine doped tin oxide coated glass slide (surface resistivity ~7 Ω/sq), and N-719 dye (95%) were the materials used in the synthesis and analysis of quaternarychalcogenide nanoparticles. All chemicals were purchased from Sigma Aldrich, except for stannic chloride, which was purchased from Saarchem. All chemicals were used without any further purification.

Colloidal Synthesis of LZTS Nanoparticles

Figure 7:
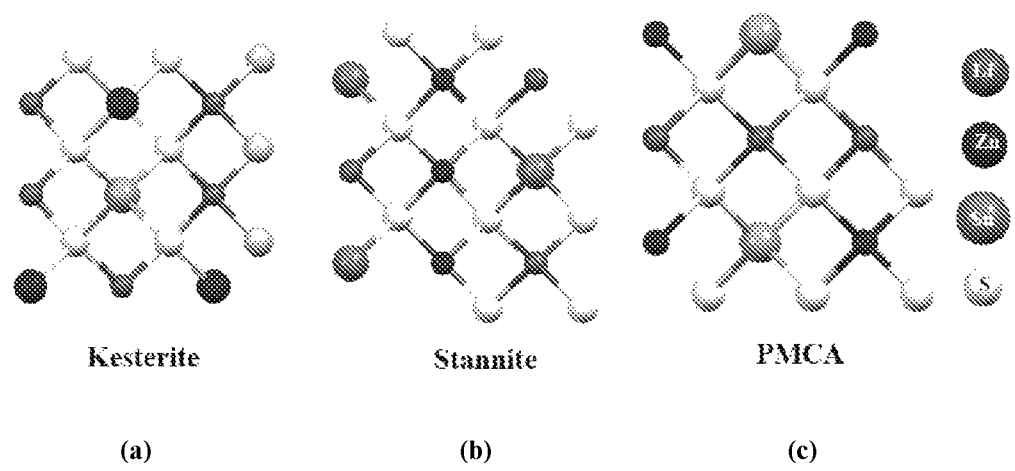
FIG. 7 shows the synthetic procedure of LZTS.

The hot injection colloidal method was used to synthesize the nanoparticles. Oleylamine (OLA –10 mL) was heated to 100° C. while stirring under nitrogen gas. This served as a purging process of the solvent/surfactant. At 100° C., the constituent precursors were added following a set sequence tabulated in FIG. 7. After the addition of the last precursor, the temperature was raised to 200° C. and held for 45 min. The mole ratio of the precursors were varied to give a 1:1:1:1 and 2:1:0.25:2 Li:Zn:Sn:S samples across all three reactions. Then resultant particles were then flocculated using ethanol, recovered by centrifugation at 3000 rpm and dried at room temperature.

Fabrication of the Dye-Sensitized Solar Cells (DSSC)

In general, a DSSC comprises a nanocrystalline titanium dioxide ($TiO_2$) electrode modified with a dye fabricated on a transparent conducting oxide (TCO), a platinum (Pt) counter electrode (CE), and an electrolyte solution with a dissolved iodide ion/triiodide ion redox couple between the electrodes. The best DSCC has achieved an efficiency of just under 12%. The modest efficiency can be balanced by further reducing the price of a DSSC; this can be achieved by replacing some of the components. Platinum is an excellent electrocatalyst, however, as well known, it is an expensive material. Several studies report on the use of CZTS and its derivatives as CEs in DSSCs. It is known that the syntheses of PVP-CZTS and CA-CZTS nanofibers used as CEs in DSSCs and they showed a power conversion efficiencies (PCE) of 3.10% and 3.90%, respectively. The PCE of the nanomaterials were found to range from 7.4% to 7.8%.

Counter Electrode Fabrication

The ink of the counter electrode was prepared by dispersing 40 mg of LZTS nanoparticles ($Li_2S$ source at 2:1:0.25:2 ratio) in a mixture of 1 mL toluene and 0.1 mL NMP. After 24 h of vigorous stirring, the homogenous solutions was sonicated for 10 min. This was followed by drop-casting the solution onto pre-cleaned and pre-heated (at 80° C.) ITO/FTO (area ~3.13 $cm^2$) for ITO and FTO) substrates. Once the ink was dry, each counter electrode was annealed at 80° C. for a further 10 min. Platinum was sputter-coated onto pre-cleaned ITO/FTO as a reference, for comparative studies.

Photo-Anode Fabrication

Titania ($TiO_2$) paste was printed onto pre-cleaned ITO/FTO substrates using the doctor blade method. The screen-printed substrates were then annealed at 350° C. for 30 min to remove any residual organic compounds and enable better contact between $TiO_2$ and the N-719 dye. The N-719 dye was then dissolved in methanol ($3.0 \times 10^{-4}$ M) and used to sensitize the $TiO_2$. A drop of the dye mixture was placed onto the annealed $TiO_2$ and left to dry overnight, in the dark at ambient conditions.

Device Assembly

The photo-anode electrode was placed with the active layer facing up and the counter electrode facing down. The two electrodes were offset from each other and the Whatman filter paper was placed in between to define the active area and act as a sponge for the supporting redoxelectrolyte solution. The supporting redox electrolyte solution, which provides a negative electrochemical potential for the reduction process, was composed of 0.05 M iodine, 0.1 M lithium iodide, 0.1 M potassium iodide, 0.1 M sodium iodide and 0.5 M 4-tert-butylpyridine. The assembled device was held together length-wise by the fold back clips on both sides to create uniform distribution.

Characterization

The nanoparticles were characterized using the following techniques: UV-vis absorption measurements were conducted using a Varian Cary Eclipse (Cary 50) UV-vis spectrophotometer. The powdered samples were dispersed in toluene and placed in a 1 cm path length quartz cuvette for the spectral analysis. The X-ray diffraction (XRD) measurements were obtained using the Bruker D2 Phaser Powder X-ray diffractometer using Cu-Kα1 radiation ($\lambda=1.54060$ Å) at 30 kV/30 mA using a glancing angle of incidence detector at an angle of 2°, for 2θ values between 10-90° in steps of 0.026° with a step time of 37 s and at a temperature of 25° C. A few milligrams of the sample were placed on a zero background holder, flatten with a glass slide. Themorphologies were obtained using a transmission electron microscope (TEM) FEI Tecnai T12 operated at 200 kV. The samples were dispersed in methanol and sonicated for 10 min. A drop of the suspended nanomaterials was then placed on a copper grid with a lacy carbon and left to dry at room temperature prior to analysing the sample. The Raman spectrum was obtained after a sample was placed into a quartz holder, using the Bruker Raman Senterra Spectrophotometer using the 532 nm excitation laser and at a very low laser power of 0.5 mV. X-ray photoelectron spectroscopy (XPS) analysis was conducted using a Physical Electronics PHI 5700 spectrometer using non-monochromatic Mg Kα X-rays (300 W, 15 kV, and 1253.6 eV) as the excitation source. Solid-state $^7Li$ MAS NMR experiments were performed on a 7.05 T Bruker Avance III 300 MHz spectrometer (m0=116.6 MHz for $^7Li$) using a Bruker 2.5 mm HFX MAS probe at a spinning speed of 30 kHz. Cyclic voltammetry (CV), electrochemical impedance (EIS), and Tafel polarization measurements were done using Biologic: VMP 300. A three-electrode system was used to conduct the CV measurements using the triiodide ($I^-/I_3^-$) redox electrolyte composed from 0.1 M $LiClO_4$, 0.01 M LiI, and 0.001 M $I_2$ dissolved in anhydrous acetonitrile, at a scan rate of 50 mV $s^{-1}$, using Pt as the counter electrode, Ag/AgCl as the reference electrode and the synthesized CZTS/CZTSe as the working electrodes after being drop-casted on a glassy carbon electrode (GC, active area ~0.07 $cm^2$) platinum (Pt, active area=0.05 $cm^2$), ITO and FTO (active area ~1.56 $cm^2$), respectively. EIS measurements were obtained using a symmetrical cell with two identical electrodes in the redox electrolyte used for DSSCs in the dark. The electrodes were analysed between 100 kHz and 100 MHz at varying open circuit potentials for each sample. The Tafel polarization analysis was conducted at a potential window of ~1.0 to 1.0 V with a scan rate of 100 $mVs^{-1}$. The photocurrent-voltage (J-V) characteristic curves of the DSCCs were measured in ambient conditions using the HP 4141B source measure unit (SMU) under controlled illumination of 100 mWcm$^{-2}$ (AM 1.5G).

Results and Discussions

Synthesis and Characterization of Li$_2$ZnS$_4$ (LZTS)

Generally, LZTS may crystallize in similar structures as CZTS and CZTSe, the kesterite (space group I4), stannite (space group I42m), or primitive mixed Cu—Au (PMCA: space group P42m) crystal structures and these are shown in FIG. 8.

Kesterite and stannite structures are body-centered tetragonal with c≈2a and may be thought of as two sulfur face-centered cubic (FCC) lattices stacked on top of each other with Li, Zn, and Sn occupying half the tetrahedral voids within this FCC lattice. The PMCA structure is primitive tetragonal with c≈a as shown in FIG. 8. The differences in the arrangement and stacking of the metal cations within the tetrahedral voids give rise to these three different structures. The kesterite structure consists of two alternating cation layers each containing Li and Zn or Li and Sn, whereas in the stannite and PMCA structures, a layer of Li alternates with a layer of Zn and Sn. In the stannite structure, the Zn and Sn atoms on the same layer switch their positions every other layer. This location swapping between Zn and Sn, every other layer, is absent in PMCA, which makes it primitive tetragonal and distinguishes it from the stannite structure. The X-ray diffraction of these structures are very similar with only small distinguishing features. The kesterite phase is usually 0.2° shifted from stannite and PMCA due to the larger distortion of the latter. The stannite and the PMCA are largely undistinguishable; however, the stannite is a more stable phase. Nevertheless, using the XRD experimental data, the lattice constants a, b and c can be calculated using equation (3) and be matched to the reference constants, thus distinguishing the two. The lattice constants are tabulated in Table 3.

$$\frac{1}{d^2} = \frac{h^2 + k^2}{a^2} + \frac{l^2}{c^2} \quad (3)$$

TABLE 3

Known lattice parameters of tetragonal LZTS structures

| Structure | a (Å) | b (Å) | c (Å) | c/a |
|---|---|---|---|---|
| Kesterite | 5.443 | 5.443 | 10.786 | 1.982 |
| Stannite | 5.403 | 5.443 | 10.932 | 2.023 |
| PMCA | 5.400 | 5.443 | 10.942 | 2.026 |

Shown in FIG. 9 (a) to (f) are the XRD patterns of LZTS synthesized according to this disclosure using different lithium precursors and at different precursor ratios and the standard reference pattern for stannite. The LiCl and Li(acac) sources at both mole ratio configurations did not match perfectly with the reference pattern suggesting the presence of impurities. However, as the source was changed to Li$_2$S, the 2:1:0.25:2 ratio matched perfectly with the reference pattern, however not all planes were diffracted suggesting preferred orientation. Because there is no reference pattern for PMCA, the calculation for the lattice constants was undertaken using equation (3).

The obtained value was closer to PMCA. The possible reason for the formation of PMCA structure for LZTS is due to the difference in atomic radii of Cu (128 pm) and Li (152 pm). In addition, transition metals (Cu) are harder than alkali metals due to the number of unpaired electrons in their valenceshells as such this may promote the distortion of the tetragonal structure in LZTS. The TEM images of LZTS synthesized using different lithium sources and different mole ratios. The LiCl based nanoparticles were quasi-spherical, poly-dispersed and agglomerated. An increase in size was observed as the concentration was increased. The Li(acac) based nanoparticles were very small, forming agglomerated cloud-like morphologies. No visible changes were observed with the change in ratios. The Li$_2$S derived particles were small quasi-spherical nanoparticles, very well dispersed. A marginal increase in size was observed with the change in the ratios.

X-ray photoelectron spectroscopy (XPS) is a useful technique to evaluate the surface chemistry as well as the bonding in the resultant particles. The XPS survey spectra for particles synthesized with different lithium sources and mole ratios were obtained. The spectra showed all the constituents of LZTS apart from the lithium. XPS has very low sensitivity towards lithium, as itis a small atomic number. The C 1s, N 1s and O 1s observed in all the spectra is attributed to the capping agent OLA and its oxidation.

Figure 11:
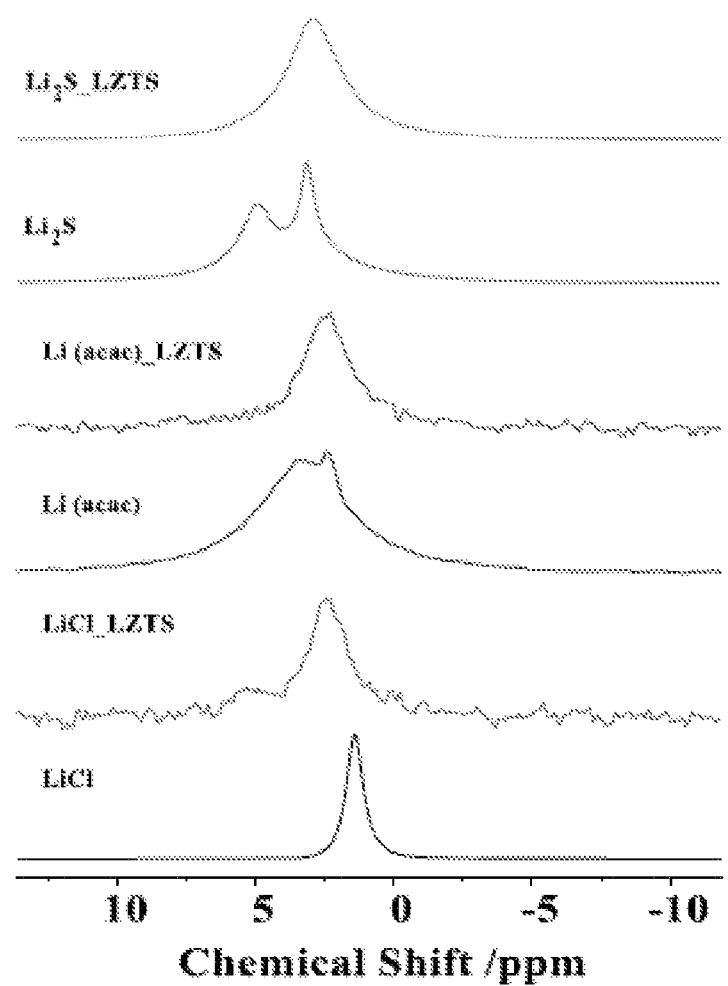
FIG. 11 shows $^7$Li MAS NMR spectra of the LiCl, Li(acac) and Li$_2$S and the corresponding LZTS spectra.

Li is high-resolution spectra of LZTS nanoparticles synthesized using different lithium sources (LiCl, Li(acac), Li$_2$S) at different precursor ratios (1:1:1:1 and 2:1:0.25:2) was conducted. For all the samples, lithium was detected. The high-resolution spectrum is more sensitive to low concentrations as compared to the survey spectrum. Metallic lithium (Li$^0$) and Li—S were detected for all samples. The intensity of the Li$_2$S derived particles (2:1:0.25:2) ratio was much high then the rest and this may be indicative of the formation of LZTS. This is consistent with the observed XRD results. Zn 2p, Sn 3d, S 2p high-resolution spectra of LZTS nanoparticles synthesized using different Li$_2$S at different precursor ratios 2:1:0.25:2 were obtained. The Zn 2p spectra for the LiCl source showed a doublet which was deconvoluted into two peaks located at 1045.4 eV and 1022.3 eV with a peak separation was 23.06 eV ascribed to the Zn$^{2+}$ species. Furthermore, Sn 3d core-level spectrum illustrated two peaks which were deconvoluted to 3d$_{3/2}$ (495.2 eV) and 3d$_{5/2}$ (486.7 cV). The peak separation of 8.41 eV was attributed to the Sn$^{4+}$ species. The high-resolution spectrum of S 2p showed two peaks which were each deconvoluted to further two peaks. Both 2p$_{3/2}$ and 2p$_{1/2}$ doublets were associated with the S$^{2-}$ species. Generally, similar results were observed for Li(acac) and Li$_2$S derived LZTS nanoparticles, apart from the Zn 2p spectrum of Li(acac) that showed doublets of doublets still attributed to the Zn$^{2+}$ ions and the S 2p spectrum of Li$_2$S that showed a presence of SO$_x$ species. To further confirm the formation of LZTS, $^7$Li MAS NMR spectra of the different lithium precursors used and the corresponding LZTS nanoparticles are shown in FIG. 11. The signature lithium peak was observed in the commercial precursors LiCl, Li(acac) and Li$_2$S at 2-3 ppm. The peak was also observed in the corresponding LZTS nanoparticles though slightly shifted. The shift confirming the coordination of Li.

Figure 12:
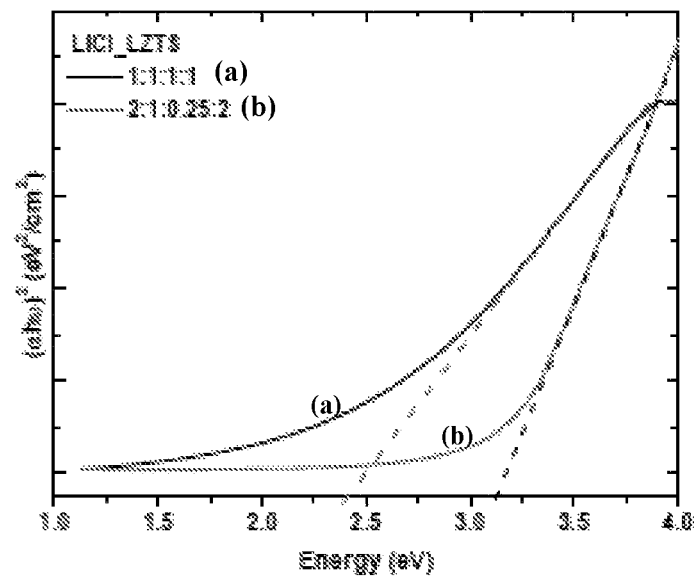
FIG. 12 show Tauc plots derived from UV-vis absorption spectra of LZTS nanoparticles synthesized using different lithium sources (LiCl, Li(acac), Li$_2$S) at different precursor ratios (1:1:1 and 2:1:0.25:2), wherein (a) shows LiCl, (b) shows Li(acac) and (c) shows Li$_2$S.
Figure 12:
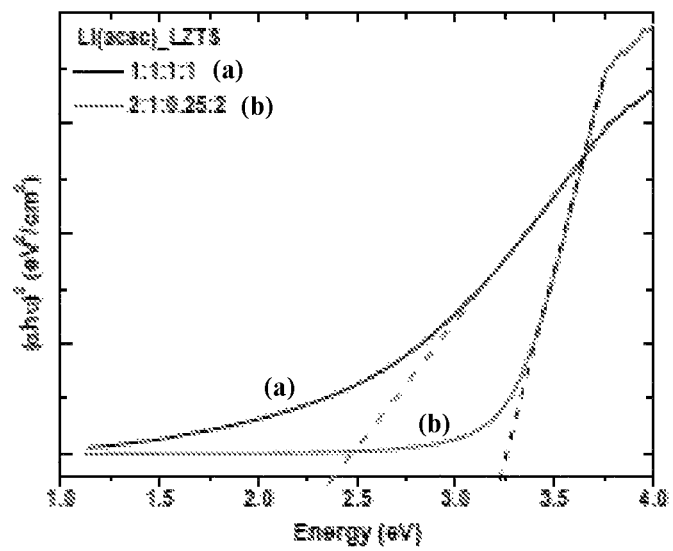
Figure 12C:
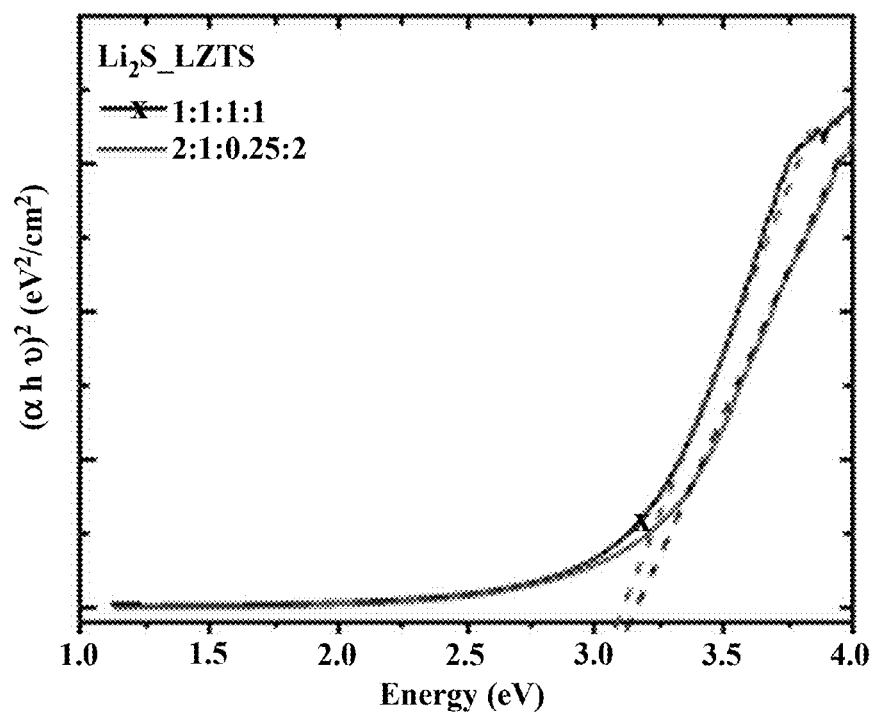

The optical properties of the LZTS nanoparticles synthesized using different precursors and ratios are shown in FIG. 12 (a) to (c). The band gap for 1:1:1:1 LiCl, Li(acac) and Li$_2$S derived particles were 2.42 eV, 2.39 eV and 3.09 eV respectively and as the ratio was changed, the band gaps were 3.13 eV, 3.23 eV and 3.14 eV, respectively. The band gap for LZTS nanoparticles derived from Li$_2$S did not change with the change of ratio.

Figure 13:
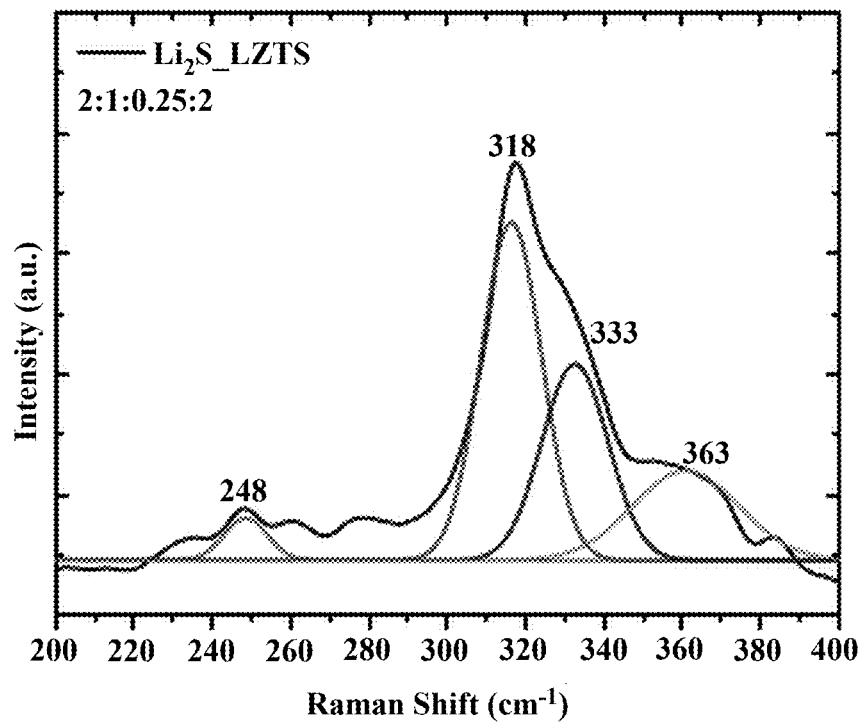
FIG. 13 shows Raman spectrum of LZTS nanoparticles synthesized using Li$_2$S and 2:1:0.25:2 ratio.

Based on the XRD, TEM, XPS and the NMR results, the best sample was evidently the LZTS nanoparticles synthesized from Li$_2$S using a 2:1:0.25:2 Li:Zn:Sn:S ratio. As such, henceforth, all the characterization and application were based on this sample. Shown in FIG. 13 is the Raman spectrum of LZTS. A prominent peak at 318 cm$^{-1}$ attributed to the A$_1$ mode of the tetragonal PMCA structure was observed. Additional peaks at ~248 cm$^{-1}$ and ~330 cm$^{-1}$-363 cm$^{-1}$ were attributed to the B$_2$ and A$_1$ modes, respectively. This further confirmed the formation of LZTS. Furthermore, the Raman analysis showed no evidence of secondary phases Application of LZTS as a Counter Electrode in Dye-Sensitized Solar Cells The LZTS nanoparticles synthesized from Li$_2$S (2:1:0.25:2) were drop-casted onto a glassy carbon electrode to investigate the electro-catalytic activity towards the reduction of the triiodide ions. The three-electrode system employed to conduct cyclic voltammetry measurements resulted in cyclic voltammograms (CVs). The CVs with the two-pairs of oxidation-reduction peaks shown in correspond to the following equations:

$$I_3^- + 2e^- \leftrightarrow 3I^- \quad (4)$$

$$3I_2 + 2e^- \leftrightarrow 3I_3^- \quad (5)$$

The catalytic activity relies on two parameters namely, the peak current |J_Red-I| and the peak-to-peak separation (Epp). Pt and LZTS peak current values were 3.53 and 3.16 mA·cm$^{-2}$ and the Epp values were 0.33 and 0.61 V, respectively (Table 4). The higher peak current and lower Epp values suggest better catalytic performance and larger reduction velocity. The RedI shift observed around the lower potential are indicative of the poor reversibility of the reaction.

TABLE 4

CV and EIS parameters from the LZTS counter electrodes drop-casted on glassy-carbon electrode

| Counter Electrode | Epp (V) | J$_{sc}$ (mA · cm$^{-2}$) | R$_s$ (ohm) | R$_{ct}$ (ohm) |
|---|---|---|---|---|
| Pt | 0.33 | 3.53 | — | — |
| LZTS-GC | 0.61 | 3.16 | 81.6 | 451 |

Figure 14:
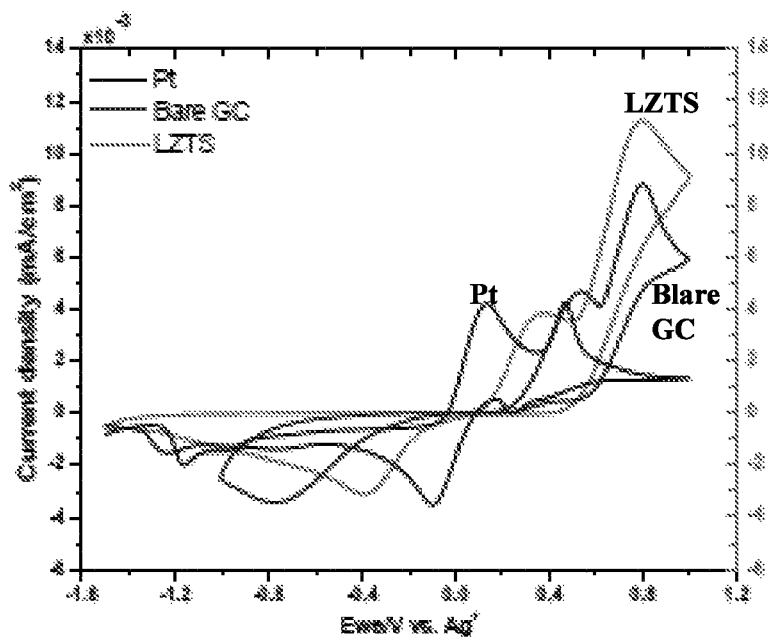
FIG. 14 shows (a) cyclic voltammetry of Pt and LZTS at a scan rate of 50 mV·s$^{-1}$, (b) a Nyquist plot of the EIS for the symmetric cell with LZTS on GC and (c) the electrochemical equivalent circuit.
Figure 14:
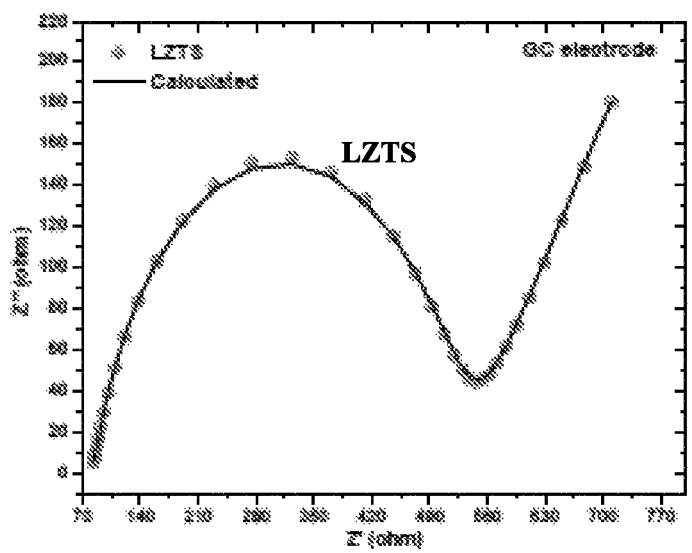

The EIS was employed to evaluate charge transfer from the CE to the electrolyte. This was conducted on symmetrical dummy cells with two identical electrodes sandwiching the I$_3^-$/I$^-$ electrolyte under dark conditions. FIG. 14 (a) to (c) shows the Nyquist plots of Pt and LZTS as well as the electrochemical equivalent circuit whose components represent four impedance properties. The abbreviation, R$_s$ signifies the series resistance, while R$_{ct}$ denotes the charge transfer resistance at the CE/electrolyte interface. Furthermore, the abbreviation C$_{dl}$ corresponds to the double layer capacitance, which is employed when a perfect semi-circle is obtained from the Nyquist plot and explains the charge storage capacity of the CEs. Lastly, Zw represents the Nernst diffusion element, often employed when a line is at 45° to the semi-circle at lower frequency region and explains if the interaction between the CE and the electrolyte is diffusion-controlled. The two key parameters, R$_s$ and R$_{ct}$, are summarized in Table 4. The high R$_{ct}$ value is indicative of the poor charge transfer.

To evaluate the effect of the substrate on the electrocatalytic properties of LZTS, the nanoparticles were drop-casted onto ITO and FTO substrates and used in EIS and Tafel plot measurements, see FIG. 15. The same equivalent circuit model was observed for the symmetrical cell EIS measurements as that of the GC as shown in FIG. 15 (e) The R$_s$ and R$_{ct}$ values for Pt and LZTS on both ITO and FTO are reported in Table 5. When using ITO as a substrate. Pt had the lowest R$_s$ value as compared to the FTO substrate. Similarly, LZTS had a lower R$_s$ value when the substrate was ITO. The lower R$_s$ values for Pt for both substrates compared to LZTS suggests that Pt is more conductive. The charge transfer process represented by the diameter of the semicircle on the high frequency region reflected on the R$_{ct}$ values. Lower R$_{ct}$ values are sort-after because they lead to higher J$_{sc}$ and FF values. Changing the substrate to FTO resulted in higher R$_s$ and R$_{ct}$ values as compared to ITO. This therefore suggests that solar cells using FTO might perform poorer.

TABLE 5

Electrochemical performance parameters obtained from EIS & Tafel polarization plots based on LZTS nanoparticles on ITO and FTO substrates

| Counter Electrode | R$_s$ (ohm) | R$_{ct}$ (ohm) | Log J0 (mA · cm$^{-2}$) | Log Jlim (mA · cm$^{-2}$) |
|---|---|---|---|---|
| Pt-ITO | 78.7 | 282 | −4.34 | −4.45 |
| LZTS-ITO | 139.4 | 396 | −4.49 | −13.5 |
| Pt-FTO | 85.5 | 4.8 ×10$^3$ | −5.57 | −5.48 |
| LZTS-FTO | 267.6 | 2.5 × 10$^6$ | −8.29 | −15.4 |

The Tafel polarization curves are depicted in FIG. 15 where the interfacial charge-transfer properties of the symmetrical dummy counter electrodes cells are studied. Two important parameters are observed from the polarization curves, namely the exchange current density (J$_0$) and the limiting diffusion current density (J$_{lim}$). Both parameters are affected by the anodic or cathodic contribution of each counter electrode and can be described using the following equation:

$$J_0 = RT/nFR_c \quad (6)$$

$$J_{lim} = 2nFDC/l \quad (7)$$

where R is the gas constant, T is the temperature (298 K), F is Faraday's constant, n (n=2) is the number of electrons, R$_{ct}$ is the charge transfer resistance, D the diffusion coefficient, C is the concentration of I$_3^-$, and l is the spacer thickness. From equation (6), J$_0$ is inversely proportional to R$_{ct}$. Therefore, J$_0$ can be correlated to the electrocatalytic activity of the CE, meaning a large J$_0$ value implies a much better catalytic activity. Similarly, larger J$_{lim}$ values indicate the larger diffusion coefficient D, which results in higher catalytic activity based on equation (7). The J$_0$ value of LZTS-ITO was comparable to the state-of-the-art Pt suggesting good electrocatalytic activity. The J$_{lim}$ value of LZTS using the ITO substrate was however smaller than Pt indicating lesser catalytic activity. Conversely, the J$_0$ and J$_{lim}$ of LZTS using the ITO substrate were higher than the corresponding FTO, further suggesting that ITO should be the substrate of choice.

Figure 16:
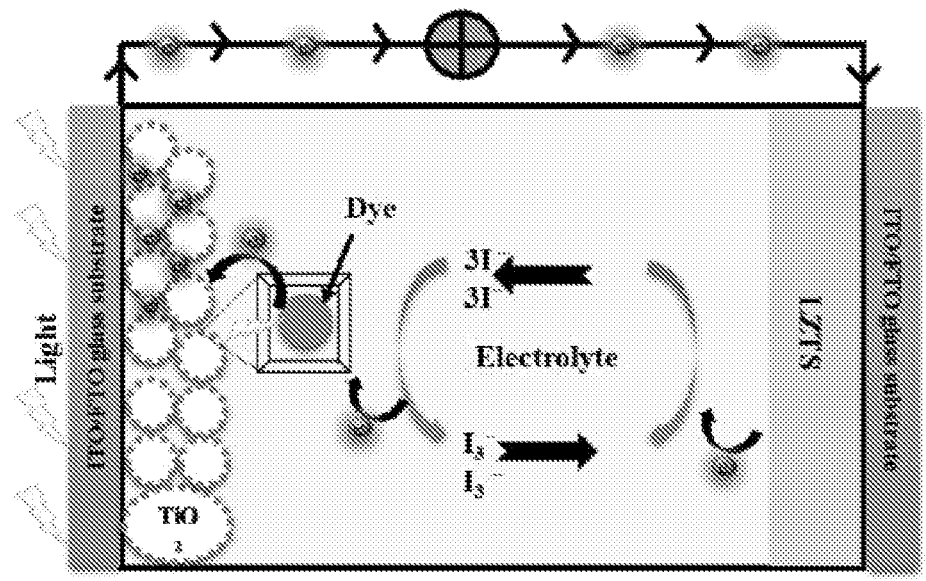
FIG. 16 shows in (a) to (d) DSSC set-up, band diagram and J-V curves of DSSCs of LZTS on ITO and FTO substrates.
Figure 16:
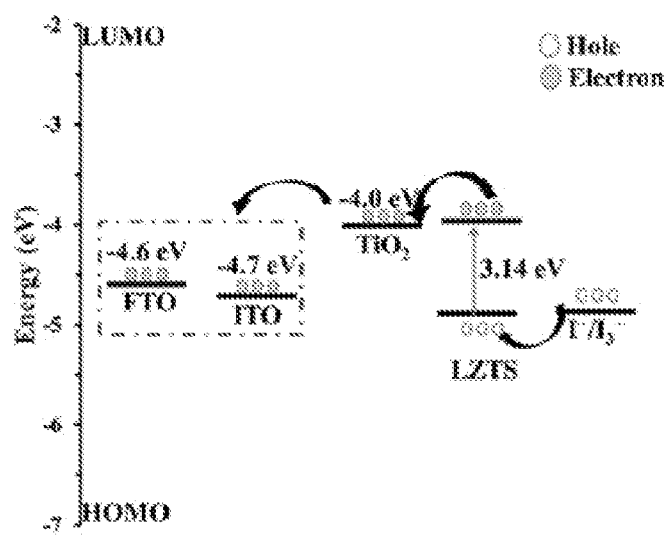
Figure 16:
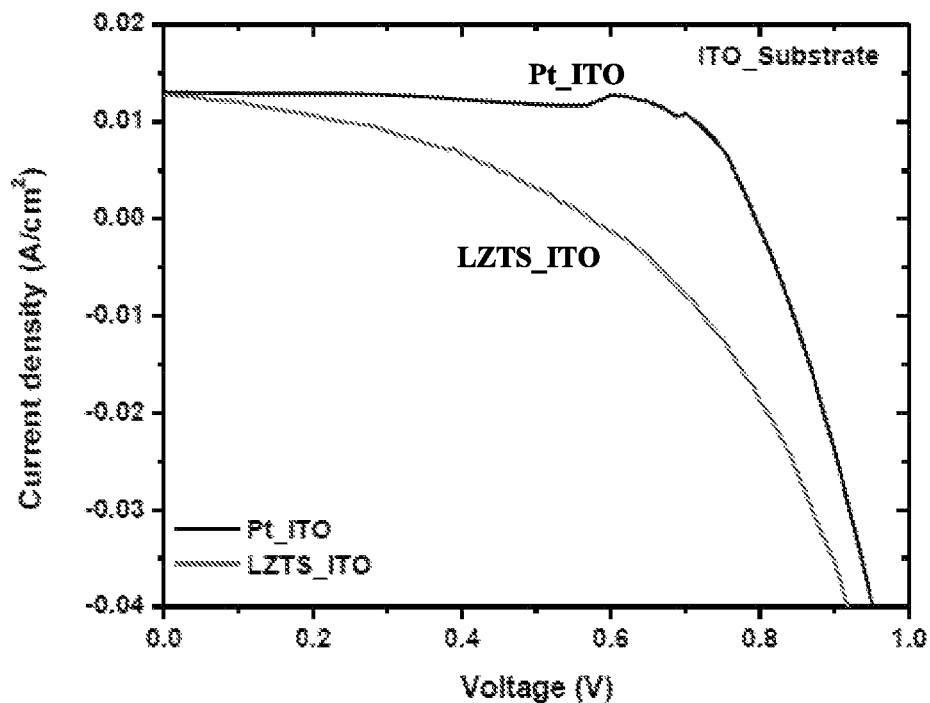
Figure 16:
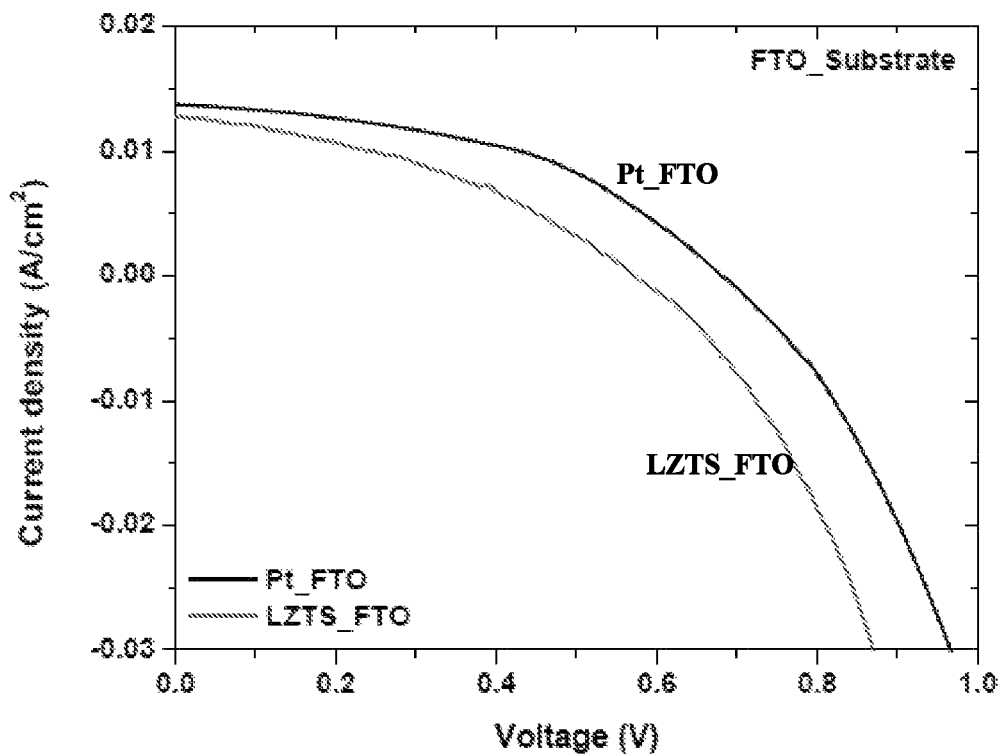

The LZTS nanoparticles were then used as CEs in DSSCs. Shown in FIG. 16 (a) is the solar cell architecture, band structure and the resultant current density-voltage (J-V)

curves derived from the two substrates. The performance of LZTS was compared against the state-of-the-art Pt electrode, however, it must be noted that these devices require optimization. The results are also summarized in Table 6. It was observed that the type of substrate used had an effect on the overall performance of the solar cell. The ITO substrate performed marginally better than the PTO substrate, although consistent with the electrochemistry data, the degree of change was lower than expected. This is strongly indicative of the need for optimization of the fabrication process. Also notably from FIG. 16 and the data in Table 6 are the low FF values across all samples. The low FF values are due to the high $R_s$ values and low shunt resistance ($R_{sh}$) values that are caused by increasing recombination at interfaces of the DSSCs.

TABLE 6

J-V parameters of DSSCs of Pt, CZTS and CZTSe on VC, ITO and FTO substrates

| Counter Electrode | $J_{sc}$ (mA · cm$^{-2}$) | $V_{oc}$ (V) | FF (%) | PCE (%) |
|---|---|---|---|---|
| Pt-ITO | 13.38 | 0.95 | 52 | 6.57 |
| LZTS-ITO | 12.93 | 0.92 | 19 | 2.26 |
| Pt-FTO | 13.55 | 0.94 | 25 | 3.12 |
| LZTS-FTO | 12.67 | 0.87 | 20 | 2.19 |

LZTS nanoparticles were successfully synthesized for the first time using the hot-injection method. Varying the lithium source from LiCl to Li(acac) and Li$_2$S and the Li:Zn:Sn:S ratio from 1:1:1:1 to 2:1:0.25:2 resulted in a formation of LZTS nanoparticles with varying properties. The LiCl and Li(acac) derived particles, irrespective of ratios used resulted in the formation of impurities as observed from the XRD patterns. The XPS, $^7$Li MAS NMR and Raman spectroscopy confirmed the presence of lithium and the formation of LZTS. The Li$_2$S source, and the 2:1:0.25:2 ratio, resulted in the purest particles as such were used as CEs in DSSCs for the first time. Two types of substrates were utilized, namely ITO and FTO. The LZTS were used successfully as electrocatalysts in DSSCs. Using different substrates resulted in different PCEs. LZTS nanoparticles on ITO gave the best performance with 2.26% PCE. It must be noted that this one preliminary study and the devices were yet to be optimized. Nevertheless, we have demonstrated that LZTS can be used as CEs in DSSCs.

The Applicant has surprisingly found the alkali metal quaternary crystalline nanomaterials described herein show enhanced properties when compared to prior art. Without being limited to theory, it is believed that the unique physico-chemical properties imparted due to unique solid-state characteristics plays an important role in this regard. Further, method of manufacture is important in attaining the unique solid-state character. The Applicant envisages conducting further experiments to conclusively show the advantages when compared to prior art solar devices. While the disclosure has been described in detail with respect to specific embodiments and/or examples thereof, it will be appreciated that those skilled in the art, upon attaining an understanding of the foregoing may readily conceive of alterations to, variations of and equivalents to these embodiments. Accordingly, the scope of the present disclosure should be assessed as that of the claims and any equivalents thereto, which claims shall be appended hereto.

The invention claimed is:

1. An alkali metal quaternary crystalline nanomaterial having general Formula A, wherein Formula A is I$_2$-II-IV-VI$_4$, wherein the nanomaterial is selected from the group consisting of Li$_2$ZnSnSe$_4$ (LZTSe), Na$_2$ZnSnSe$_4$ (NZTSe), Li$_2$ZnSnS$_4$ (LZTS), and Na$_2$ZnSnS$_4$ (NZTS);
   wherein a crystal phase of the crystalline nanomaterial is not kesterite and/or stannite; and
   wherein the crystal phase of the nanomaterial is a primitive mixed Cu—Au like structure (PMCA) and the nanomaterial has a space group: P$\bar{4}$2m.

2. The alkali metal quaternary crystalline nanomaterial of claim 1, wherein the nanomaterial is Li$_2$ZnSnSe$_4$ (LZTSe).

3. The alkali metal quaternary crystalline nanomaterial of claim 1, wherein the nanomaterial is Na$_2$ZnSnSe$_4$ (NZTSe).

4. The alkali metal quaternary crystalline nanomaterial of claim 1, wherein the nanomaterial is Li$_2$ZnSnS$_4$ (LZTS).

5. The alkali metal quaternary crystalline nanomaterial of claim 1, wherein the nanomaterial is Na$_2$ZnSnS$_4$ (NZTS).

6. A solar cell comprising a substrate having applied thereto the alkali metal quaternary crystalline nanomaterial of claim 1.

7. The solar cell of claim 6, wherein the substrate is molybdenum coated glass.

8. The solar cell of claim 6, further including a CdS, ZnO or Al coating.

9. A method for the manufacture of the solar cell according to claim 6 wherein the substrate has applied thereto a CdS, ZnO or Al coating, the method including the steps of:
   (i) providing a solution of the alkali metal quaternary crystalline nanomaterial;
   (ii) coating the alkali metal quaternary crystalline nanomaterial solution onto a molybdenum coated glass substrate forming an alkali metal quaternary crystalline nanomaterial coated substrate;
   (iii) drying the alkali metal quaternary crystalline nanomaterial coated substrate at about between 60° C. and 80° C.;
   (iv) providing a solution of CdS in a solvent;
   (v) coating, the dried alkali metal quaternary crystalline nanomaterial coated substrate with CdS solution to provide a CdS coated substrate; and
   (vi) coating ZnO onto the CdS coated substrate.

10. The method according to claim 9, wherein the solution in step (i) comprises toluene and the solvent in step (iv) is toluene.

11. The method according to claim 10, wherein the coating in steps (ii), (v) and (vi) is spin coating.

* * * * *